United States Patent
McClarren et al.

(10) Patent No.: US 8,901,189 B2
(45) Date of Patent: Dec. 2, 2014

(54) NOP FOAM

(75) Inventors: Patricia J. McClarren, Ypsilanti, MI (US); Ryoko Yamasaki, Ypsilanti, MI (US); James T. McEvoy, Howell, MI (US); Terry M. McRoberts, Holly, MI (US); William W. Li, Ypsilanti, MI (US)

(73) Assignee: Johnsons Controls Technology Company, Holland, MI (US)

( * ) Notice: Subject to any disclaimer, the term of this patent is extended or adjusted under 35 U.S.C. 154(b) by 658 days.

(21) Appl. No.: 12/447,846

(22) PCT Filed: Oct. 30, 2007

(86) PCT No.: PCT/US2007/083073
§ 371 (c)(1),
(2), (4) Date: Jun. 16, 2009

(87) PCT Pub. No.: WO2008/055189
PCT Pub. Date: May 8, 2008

(65) Prior Publication Data
US 2010/0069519 A1    Mar. 18, 2010

Related U.S. Application Data

(60) Provisional application No. 60/855,153, filed on Oct. 30, 2006.

(51) Int. Cl.
*C08G 18/28*    (2006.01)

(52) U.S. Cl.
USPC ........ 521/173; 521/109.1; 521/130; 521/134; 521/170; 521/172; 521/174

(58) Field of Classification Search
CPC ............. C08J 2203/10; C08J 2205/06; C08G 2101/0008; C08G 2101/0083; C08G 18/4018
USPC .............. 521/109.1, 130, 134, 170, 172, 173, 521/174
See application file for complete search history.

(56) References Cited

U.S. PATENT DOCUMENTS

| | | | |
|---|---|---|---|
| 4,260,530 A | 4/1981 | Reischl | |
| 4,374,209 A | 2/1983 | Rowlands | |
| 4,423,162 A | 12/1983 | Peerman et al. | |
| 4,452,923 A | 6/1984 | Carroll | |
| 4,554,306 A | 11/1985 | Carroll | |
| 4,785,026 A | 11/1988 | Yeakey | |
| 4,950,694 A | 8/1990 | Hager | |
| 5,068,280 A | 11/1991 | Pal | |
| 5,179,131 A | 1/1993 | Wujcik | |
| 5,292,778 A | 3/1994 | Van Veen | |
| 5,488,085 A | 1/1996 | Hayes | |
| 5,496,894 A | 3/1996 | Critchfield | |
| 5,552,486 A | 9/1996 | Guo | |
| 5,688,861 A | 11/1997 | Simroth | |
| 5,845,386 A | 12/1998 | Shen | |
| 5,990,185 A | 11/1999 | Fogg | |
| 6,180,686 B1 | 1/2001 | Kurth | |
| 6,281,373 B1 | 8/2001 | Sato | |
| 6,417,241 B1 | 7/2002 | Huygens | |
| 6,753,029 B1 | 6/2004 | Tysinger | |
| 6,881,783 B1 | 4/2005 | Verhelst | |
| 6,891,053 B2 | 5/2005 | Chasar | |
| 7,960,444 B2 | 6/2011 | Lysenko et al. | |
| 2002/0060445 A1 | 5/2002 | Shirk | |
| 2004/0209971 A1 | 10/2004 | Kurth | |
| 2005/0020708 A1 | 1/2005 | Karami | |
| 2005/0070620 A1 | 3/2005 | Herrington et al. | |
| 2006/0229375 A1 | 10/2006 | Hsiao | |
| 2006/0276609 A1 | 12/2006 | Lysenko et al. | |
| 2007/0037953 A1* | 2/2007 | Geiger et al. | 528/44 |

FOREIGN PATENT DOCUMENTS

| | | |
|---|---|---|
| CA | 2523507 | 11/2004 |
| EP | 2089204 | 8/2009 |
| WO | 9852988 | 11/1998 |
| WO | WO2006065345 A1 | 6/2006 |
| WO | 2008055189 | 5/2008 |

OTHER PUBLICATIONS

Technology Roadmap for Plant/Crop-Based Renewable Resources 2020, 2005, 20 and 31-33, National Technical Information Services, Washington, D.C.

Ashok Mulchandani, Biotechnology for Fuels and Chemicals, Applied Biochemistry and Biotechnology, Spring 2004, vols. 113-116, Humana Press.

Renata Costa Silva Araújo, Effects of biopitch on the properties of flexible polyurethane foams, European Polymer Journal, 2005, 1420-1428, 41, Elsevier Ltd.

(Continued)

*Primary Examiner* — John Cooney
(74) *Attorney, Agent, or Firm* — Fletcher Yoder, P.C.

(57) ABSTRACT

A foam article, for use in a seat such as a seat cushion, includes an open cell, polyurethane foam material that includes a plant oil-based polyol material content greater than five percent and is produced from the reaction of a base polyol formulation blend including at least a portion of a plant oil-based polyol, a copolymer polyol including at least a portion of a plant oil-based polyol, water, a cross-linking agent, a catalyst, cell opener and a surfactant that are reacted with an isocyanate material for producing the seat cushion having performance specifications that are equivalent or better than the performance characteristics for a traditional petroleum oil-based polyol material seat cushion.

6 Claims, 21 Drawing Sheets

(56) References Cited

OTHER PUBLICATIONS

Kattimuttathu I. Suresh, Synthesis, Structure, and Properties of Novel Polyols from Cardanol and Developed Polyurethanes, Industrial & Engineering Chemistry Research, 2005, 4504-4512, 44, American Chemical Society.

Zoran S. Petrović, Structure and Properties of Polyurethanes Prepared from Triglyceride Polyols by Ozonolysis, Biomacromolecules, 2005, 713-719, 6, American Chemical Society.

Y. Lin, Water-Blown Flexible Polyurethane foam Extended with Biomass Materials, Journal of Applied Polymer Science, 1997, 695-703, 65, John Wiley & Sons, Inc.

Andrew Guo, Structure and Properties of Halogenated and Nonhalogenated Soy-Based Polyols, Journal of Polymer Science: Part A: Polymer Chemistry, 2000, 3900-3910, vol. 38, John Wiley & Sons.

Zoran S. Petrović, Epoxidation of soybean oil in toluene with peroxoacetic and peroxoformic acids—kinetics and side reactions, European Journal of Lipid Science and Technology, 2002, 293-299, 104, WILEY-VCH Verlag GmbH, Weinheim, Germany.

Tarik Eren, One step hydroxybromination of fatty acid derivatives, European Journal of Lipid Science and Technology, 2004, 27-34, 106, WILEY-VCH Verlag GmbH, Weinheim, Germany.

Hélène Pelletier, Preparation of acrylated and urethanated triacylglycerols, European Journal of Lipid Science and Technology, 2006, 411-420, 108, WILEY-VCH, Verlag Gmbh, Weinheim, Germany.

T.W. Pechar, Characterization and Comparison of Polyurethane Networks Prepared Using Soybean-Based Polyols with Varying Hydroxyl Content and Their Blends with Petroleum-Based Polyols, Journal of Applied Polymer Science, 2006, 1432-1443, vol. 101, Wiley Periodicals, Inc.

A.R. Fornof, Synthesis and Characterization of Triglyceride-Based Polyols and Tack-Free Coatings via the Air Oxidation of Soy Oil, Journal of Applied Polymer Science, 2006, 690-697, vol. 102, Wiley Periodicals, Inc.

Jacob John, Characterization of Polyurethane Foams from Soybean Oil, Journal of Applied Polymer Science, 2002, 3097-3107, vol. 86, Wiley Periodicals, Inc.

Andrew Guo, Rigid Polyurethane Foams Based on Soybean Oil, Journal of Applied Polymer Science, 2000, 467-473, vol. 77, John Wiley & Sons, Inc.

Zoran S. Petrović, Structure and Properties of Polyurethanes Based on Halogenated and Nonhalogenated Soy-Polyols, Journal of Polymer Science: Part A: Polymer Chemistry, 2000, 4062-4069, vol. 38, John Wiley & Sons, Inc.

Zoran S. Petrović, Effect of OH/NCO Molar Ratio on Properties of Soy-Based Polyurethane Networks, Journal of Polymers and the Environment, 2002, 5-12, vol. 10, Nos. 1/2, Plenum Publishing Corporation.

Ivan Javni, Effect of Different Isocyanates on the Properties of Soy-Based Polyurethanes, Journal of Applied Polymer Science, 2003, 2912-2916, vol. 88, Wiley Periodicals, Inc.

I. Javni, Soybean-Oil-Based Polyisocyanurate Rigid Foams, Journal of Polymers and the Environment, 2004, 123-129, vol. 12, Plenum Publishing Corporation.

Suhreta Husić, Thermal and mechanical properties of glass reinforced soy-based polyurethane composites, Composites Science and Technology, 2005, 19-25, 65, Elsevier Ltd.

Luciane L. Monteavaro, Polyurethane Networks from Formiated Soy Polyols: Synthesis and Mechanical Characterization, Journal of the American Oil Chemists' Society, May 2005, 365-371, 82, AOCS Press.

Phuong Tran, Ozone-Mediated Polyol Synthesis from Soybean Oil, Journal of the American Oil Chemists' Society, Sep. 2005, 653-659, vol. 82, No. 9, 82, AOCS Press.

Zoran S. Petrović, Soy-Oil-Based Segmented Polyurethanes, Journal of Polymer Science: Part B: Polymer Physics, 2005, 3178-3190, vol. 43, Wiley Periodicals, Inc.

J.-P. Latere Dwan'Isa, Novel Biobased Polyurethanes Synthesized from Soybean Phosphate Ester Polyols: Thermomechanical Properties Evaluations, Journal of Polymers and the Environment, Oct. 2003, 161-168, vol. 11, No. 4, Plenum Publishing Corporation.

Ajay Pal Singh, Viscoelastic Changes and Cell Opening of Reacting Polyurethane Foams From Soy Oil, Polymer Engineering and Science, Oct. 2004, 1977-1986, vol. 44, No. 10, Society of Plastics Engineers.

Johan Steenwijk, Long-term heat stabilisation by (natural) polyols in heavy metal- and zinc-free poly(vinyl chloride), Polymer Degradation and Stability, 2006, 52-59, 19, Elsevier Ltd.

Fred Gerdeman, Biomass Program, Functionalized Vegetable Oils for Use as Polymer Building Blocks, Sep. 2004, Pittsburg State University, Cargill, Inc.

Terik Eren, One step hydroxybromination of fatty acid derivatives, Eur. J. Lipid Sci, Technol. 106 (2004) 27-34, Department of Chemistry and Polymer Research Center, Bogazici University, Bebek, Istanbul, Turkey.

Yongshang Lu, Preparation and properties of starch thermoplastics modified with waterborne polyurethan from renewable resources, Science Direct, Polymer 46 (2005) 9863-9870.

Arthur J. Ragauskas, The Path Forward for Biofuels and Biomaterials, Science Magazine, Jan. 27, 2006, vol. 311.

U.S. Department of Agriculture, Biomass as Feedstock for a Bioenergy and Bioproducts Industry: The Technical Feasibility of a Billion-Ton Annual Supply, Apr. 2005.

Ajay Pal Singh, Use of Glycerine in Renewable Resources Research Honored; Kansas Researcher Receives SDA Glycerine Innovation Award; Business Wire May 2, 2005, pNA.

Beheshti, H KR, A simplified test methodology for crashworthiness evaluation of aircraft seat cushions, International Journal of Crashworthiness, vol. 11, No. 1, pp. 27-35, 2006, Department of Mechanical Engineering, Wichita State University, Wichita, KS 67260-0133, USA.

Agrol Product Line Price List, Effective Apr. 1, 2006, Bio Based Technologies.

Zafar, Fahmina, Ambient-Cured Polyesteramide-Based Anticorrosive Coatings from Linseed Oil-A Sustainable Resource, Journal of Applied Polymer Science, vol. 97, No. 5, pp. 1818-1824. Sep. 5, 2005.

Potente, Helmut, Description of the Foaming Process Furing the Extrusion of Foams based on Renewable Resources, Journal of Cellular Plastics, vol. 42, No. 3, pp. 241-253, May 2006.

Oil Crops: Situation and Outlook Yearbook, 2006, Economic Research Service, Washington, D.C. Market and Trade Economics Div. May 2006. 86p.

Anonymous, Cars From Corn? Food Engineering; May 1998, 70, 5; ABI/INFORM Trade Industry p. 19.

Zafar, Fahmina, Ambient-Cured Polyesteramide-Based Anticorrosive Coatings from Linseed Oil-A Sustainable Resource, Journal of Applied Polymer Science. vol. 97, No. 5, pp. 1818-1824. Sep. 5, 2005.

Mannari, Vijay M., Two-component high-Solid polyurethane coating systems based on soy polyols., JCT Research 1547-0091 Apr. 2006, v3 i2, p. 151(7).

Hope Molinaro, Soy-Based Polyol Challenges Traditional Polyurethanes, Plastics Engineering 55.11 (Nov. 1999): p. 67.

Deligio, Tony, The drive for Green: (Market Update); Modem Plastics Worldwide Jun. 2006, v83 i6, p. 40(3).

De Guzman, Doris, Soy polyols in polyurethanes emerge as niche market: (Oils, Fats & Waxes), Chemical Market Reporter 1092-0110 Sep. 22, 2003, v264 i9, p. 14(I).

Freemantle, Michael, Section 2—Oils, Fats & Waxes—Soy Polyols, Chemical market reporter, 264, No. 9, (2003): 14, 2003.

Corn and an Agricultural Vision: Renewable Chemical Building Blocks for the Future. National Corn Growers Association; PR Newswire Apr. 19, 2000, pNA.

Supplementary Partial European Search Report for application No. EP 07 86 3675 completed Nov. 24, 2010.

* cited by examiner

| Formulation | | Formulation Details - PPH Polyol | | | | | | | | Process Details (Hand Pour) | | Values are average of 2 samples | | | |
|---|---|---|---|---|---|---|---|---|---|---|---|---|---|---|---|
| n | Base Polyol | Petrol Oil-based Base Polyol | Plant Oil-based Base Polyol | Petrol Oil-based Copolymer | Water | Cross-linker | Catalysts | Surfactants | Poly:Iso Ratio | Cure | TPR | Rate of Rise (mm/sec) | Rise Height (mm) | Maximum Height (mm) | Rate of Rise |
| 1 | 3901 | 60.00 | 0.00 | 40.00 | 2.50 | 1.50 | 0.42 | 0.95 | 3.319 | 5 min | 4 min | 141.33 | 155.77 | 158.73 | |
| 2 | 3901/Agrol 1.3 | 55.00 | 5.00 | 40.00 | 2.50 | 1.50 | 0.44 | 0.95 | 3.249 | 4.45 min | 4 min | 140.30 | 154.13 | 157.03 | |
| 3 | 3901/Agrol 1.3 | 50.00 | 10.00 | 40.00 | 2.50 | 1.50 | 0.46 | 0.95 | 3.182 | 5 min | 4 min | 135.00 | 151.97 | 154.83 | |
| 4 | 3901/Agrol 1.3 | 45.00 | 15.00 | 40.00 | 2.50 | 1.50 | 0.48 | 0.95 | 3.118 | 6 min | 5 min | 131.00 | 153.40 | 156.30 | |
| 5 | 3901/Soyol 170A | 55.00 | 5.00 | 40.00 | 2.50 | 1.50 | 0.44 | 0.95 | 3.208 | 4.45 min | 4 min | 151.83 | 153.97 | 156.90 | |
| 6 | 3901/Soyol 170A | 50.00 | 10.00 | 40.00 | 2.50 | 1.50 | 0.46 | 0.95 | 3.105 | 5 min | 4 min | 151.70 | 156.10 | 159.10 | |
| 7 | 3901/Soyol 170A | 45.00 | 15.00 | 40.00 | 2.50 | 1.50 | 0.48 | 0.95 | 3.008 | 6 min | 5 min | 163.23 | 160.13 | 163.20 | |
| 8 | 9139 | 60.00 | 0.00 | 40.00 | 2.50 | 1.50 | 0.42 | 0.95 | 3.319 | 5 min | 4 min | 152.83 | 158.37 | 161.37 | |
| 9 | 9139/Agrol 1.3 | 55.00 | 5.00 | 40.00 | 2.50 | 1.50 | 0.44 | 0.95 | 3.249 | 6 min | 5 min | 143.93 | 148.83 | 151.67 | |
| 10 | 9139/Agrol 1.3 | 50.00 | 10.00 | 40.00 | 2.50 | 1.50 | 0.46 | 0.95 | 3.182 | 5 min | 4 min | 133.27 | 156.07 | 158.93 | |
| 11 | 9139/Agrol 1.3 | 45.00 | 15.00 | 40.00 | 2.50 | 1.50 | 0.48 | 0.95 | 3.118 | 6 min | 5 min | 132.53 | 154.60 | 157.50 | |
| 12 | 9139/Soyol 170A | 55.00 | 5.00 | 40.00 | 2.50 | 1.50 | 0.44 | 0.95 | 3.208 | 5 min | 5 min | 158.00 | 153.57 | 156.50 | |
| 13 | 9139/Soyol 170A | 50.00 | 10.00 | 40.00 | 2.50 | 1.50 | 0.46 | 0.95 | 3.232 | 5 min | 4 min | 156.87 | 154.77 | 157.70 | |
| 14 | 9139/Soyol 170A | 45.00 | 15.00 | 40.00 | 2.50 | 1.50 | 0.48 | 0.95 | 3.008 | 6 min | 5 min | 145.93 | 158.73 | 161.80 | |
| 15 | E833 | 60.00 | 0.00 | 40.00 | 2.50 | 1.50 | 0.42 | 0.95 | 3.281 | 5 min | 4 min | 151.10 | 151.23 | 154.10 | |
| 16 | E833/Agrol 1.3 | 55.00 | 5.00 | 40.00 | 2.50 | 1.50 | 0.44 | 0.95 | 3.215 | 5 min | 4 min | 127.53 | 151.47 | 154.27 | |
| 17 | E833/Agrol 1.3 | 50.00 | 10.00 | 40.00 | 2.50 | 1.50 | 0.46 | 0.95 | 3.152 | 5 min | 4 min | 142.33 | 149.20 | 152.03 | |
| 18 | E833/Agrol 1.3 | 45.00 | 15.00 | 40.00 | 2.50 | 1.50 | 0.48 | 0.95 | 3.092 | 6 min | 5 min | 136.43 | 153.67 | 156.57 | |
| 19 | E833/Soyol 170A | 55.00 | 5.00 | 40.00 | 2.50 | 1.50 | 0.44 | 0.95 | 3.176 | 5 min | 4 min | 190.57 | 135.57 | 138.10 | |
| 20 | E833/Soyol 170A | 50.00 | 10.00 | 40.00 | 2.50 | 1.50 | 0.46 | 0.95 | 3.077 | 5 min | 5 min | 134.30 | 159.97 | 163.07 | |
| 21 | E833/Soyol 170A | 45.00 | 15.00 | 40.00 | 2.50 | 1.50 | 0.48 | 0.95 | 2.984 | 6 min | 5 min | 140.17 | 160.13 | 163.27 | |
| 22 | E960 | 60.00 | 0.00 | 40.00 | 2.50 | 1.50 | 0.42 | 0.95 | 3.344 | 5 min | 4 min | 127.10 | 149.53 | 152.40 | |
| 23 | E960/Agrol 1.3 | 55.00 | 5.00 | 40.00 | 2.50 | 1.50 | 0.44 | 0.95 | 3.271 | 5 min | 4 min | 159.90 | 153.23 | 156.13 | |
| 24 | E960/Agrol 1.3 | 50.00 | 10.00 | 40.00 | 2.50 | 1.50 | 0.46 | 0.95 | 3.201 | 5 min | 4 min | 158.20 | 156.10 | 159.07 | |
| 25 | E960/Agrol 1.3 | 45.00 | 15.00 | 40.00 | 2.50 | 1.50 | 0.48 | 0.95 | 3.134 | 6 min | 5 min | 125.50 | 157.20 | 160.20 | |
| 26 | E960/Soyol 170A | 55.00 | 5.00 | 40.00 | 2.50 | 1.50 | 0.44 | 0.95 | 3.229 | 5 min | 4 min | 150.57 | 154.30 | 157.27 | |
| 27 | E960/Soyol 170A | 50.00 | 10.00 | 40.00 | 2.50 | 1.50 | 0.46 | 0.95 | 3.123 | 5 min | 4 min | 161.77 | 155.53 | 158.53 | |
| 28 | E960/Soyol 170A | 45.00 | 15.00 | 40.00 | 2.50 | 1.50 | 0.48 | 0.95 | 3.023 | 6 min | 5 min | 153.57 | 151.10 | 154.00 | |

FIG. 5A

Values are average of 2 samples

| | | IFD | | Hysteresis | | Transmissibility | | | |
|---|---|---|---|---|---|---|---|---|---|
| n | Initial Height (mm) | Weight (g) | Force at 25% Deflection (N) | Force at 50% Deflection (N) | Hysteresis Loss (%) | Natural Frequency | Peak Transmissibility (A/Ao) | Attenuation Frequency | Transmissibility at 6 Hz | Comfort Number |
| 1 | 97.21 | 808 | 215.65 | 386.86 | 21.80 | 3.09 | 7.67 | 4.82 | 0.49 | 23.65 |
| 2 | 97.67 | 826 | 248.93 | 448.18 | 23.87 | 3.21 | 6.45 | 5.03 | 0.59 | 20.66 |
| 3 | 97.59 | 825 | 219.15 | 398.40 | 25.73 | 3.32 | 5.96 | 5.24 | 0.66 | 19.77 |
| 4 | 97.67 | 826 | 227.26 | 413.12 | 29.19 | 3.52 | 5.06 | 5.62 | 0.83 | 17.79 |
| 5 | 97.65 | 831 | 248.36 | 453.33 | 23.39 | 3.20 | 6.74 | 5.00 | 0.56 | 21.55 |
| 6 | 97.44 | 825 | 224.63 | 411.78 | 24.45 | 3.28 | 6.25 | 5.17 | 0.62 | 20.47 |
| 7 | 97.47 | 829 | 235.70 | 433.03 | 27.02 | 3.38 | 4.99 | 5.40 | 0.73 | 16.82 |
| 8 | 96.84 | 815 | 213.44 | 384.78 | 21.00 | 3.10 | 7.15 | 4.75 | 0.50 | 22.11 |
| 9 | 97.35 | 828 | 231.16 | 418.90 | 23.47 | 3.15 | 6.19 | 4.93 | 0.57 | 19.45 |
| 10 | 98.00 | 820 | 241.43 | 446.20 | 22.62 | 3.19 | 7.25 | 4.85 | 0.54 | 23.13 |
| 11 | 97.68 | 829 | 218.77 | 403.60 | 28.54 | 3.52 | 5.22 | 5.64 | 0.83 | 18.33 |
| 12 | 97.19 | 819 | 239.49 | 434.55 | 21.48 | 3.08 | 6.13 | 4.73 | 0.47 | 18.83 |
| 13 | 97.28 | 824 | 219.11 | 395.59 | 23.35 | 3.20 | 5.71 | 4.99 | 0.57 | 18.27 |
| 14 | 97.71 | 841 | 252.70 | 468.84 | 27.14 | 3.41 | 4.98 | 5.38 | 0.71 | 16.94 |
| 15 | 97.33 | 820 | 230.56 | 424.27 | 21.85 | 3.14 | 7.25 | 4.77 | 0.48 | 22.77 |
| 16 | 96.93 | 827 | 239.42 | 435.83 | 23.76 | 3.24 | 6.34 | 5.10 | 0.62 | 20.49 |
| 17 | 97.42 | 835 | 238.37 | 438.82 | 25.86 | 3.38 | 5.50 | 5.30 | 0.68 | 18.55 |
| 18 | 97.76 | 830 | 227.34 | 423.65 | 28.53 | 3.51 | 5.04 | 5.59 | 0.82 | 17.67 |
| 19 | 97.20 | 834 | 247.08 | 449.38 | 23.32 | 3.17 | 5.72 | 4.90 | 0.51 | 18.12 |
| 20 | 97.29 | 835 | 252.60 | 454.09 | 24.73 | 3.25 | 4.97 | 4.99 | 0.54 | 16.13 |
| 21 | 97.86 | 841 | 276.91 | 486.05 | 27.25 | 3.46 | 3.82 | 5.38 | 0.71 | 13.18 |
| 22 | 97.33 | 806 | 234.48 | 419.70 | 21.49 | 3.07 | 7.45 | 4.69 | 0.46 | 22.83 |
| 23 | 97.71 | 809 | 242.43 | 413.63 | 23.92 | 3.08 | 3.88 | 4.81 | 0.54 | 11.94 |
| 24 | 97.31 | 816 | 226.76 | 396.88 | 25.90 | 3.21 | 4.52 | 5.00 | 0.57 | 14.49 |
| 25 | 97.47 | 808 | 205.37 | 373.67 | 28.32 | 3.42 | 4.69 | 5.51 | 0.78 | 16.02 |
| 26 | 96.13 | 825 | 244.45 | 430.01 | 23.04 | 3.09 | 4.72 | 4.76 | 0.49 | 14.57 |
| 27 | 95.07 | 823 | 216.66 | 388.16 | 24.07 | 3.27 | 4.01 | 5.06 | 0.58 | 13.09 |
| 28 | 95.93 | 839 | 255.34 | 482.00 | 27.34 | 3.50 | 5.22 | 5.57 | 0.80 | 18.23 |

FIG. 5B

Each value is from single sample

| n | Density Density (g/cm³) | 50% Dry Set 50% Dry Set (%) | 50% Wet Set 50% Wet Set (%) | Ball Rebound Impact Resilience (%) | Tensile/Elongation Tensile Strength (kPa) | Elongation (%) | Tear Tear Resistance (N/cm) | Fogging Fogging (%) | Repeated Compression Height Loss (%) | 25% Loss (%) | 50% Loss (%) |
|---|---|---|---|---|---|---|---|---|---|---|---|
| 1 | 0.048 | 5.62 | 16.38 | 65 | 172.80 | 121.30 | 9.00 | 98.61 | 0.01 | 0.10 | 0.00 |
| 2 | 0.049 | 4.80 | 15.10 | 61 | No Data | No Data | 9.60 | 99.12 | 0.73 | 9.41 | -1.48 |
| 3 | 0.048 | 5.65 | 16.72 | 58 | No Data | No Data | 8.70 | 99.29 | 0.01 | 0.10 | -0.03 |
| 4 | 0.049 | 6.06 | 17.01 | 51 | No Data | No Data | 8.90 | 99.03 | 0.01 | 0.13 | -0.02 |
| 5 | 0.049 | 4.50 | 17.00 | 63 | No Data | No Data | 8.90 | 90.95 | 0.67 | 9.55 | -0.85 |
| 6 | 0.049 | 5.62 | 15.59 | 64 | No Data | No Data | 8.70 | 99.44 | 0.91 | 7.92 | -2.83 |
| 7 | 0.048 | 5.36 | 19.35 | 56 | No Data | No Data | 7.50 | 98.37 | 0.93 | 10.94 | -1.67 |
| 8 | 0.048 | 5.66 | 16.54 | 64 | 181.00 | 124.50 | 7.60 | 98.25 | 0.01 | 0.08 | -0.01 |
| 9 | 0.049 | 5.30 | 17.10 | 60 | No Data | No Data | 9.10 | 99.40 | 0.79 | 10.48 | -0.61 |
| 10 | 0.049 | 5.62 | 15.59 | 64 | No Data | No Data | 8.70 | 99.44 | 0.91 | 7.92 | -2.83 |
| 11 | 0.049 | 5.44 | 17.40 | 52 | No Data | No Data | 7.70 | 99.13 | 1.10 | 11.80 | -2.05 |
| 12 | 0.480 | 5.00 | 19.00 | 63 | No Data | No Data | 9.70 | 98.96 | 0.80 | 9.58 | -0.56 |
| 13 | 0.049 | 4.66 | 15.40 | 61 | No Data | No Data | 8.10 | 99.17 | 0.75 | 7.51 | -3.28 |
| 14 | 0.050 | 5.08 | 23.14 | 57 | No Data | No Data | 7.40 | 99.00 | 0.98 | 10.28 | -2.07 |
| 15 | 0.049 | 5.74 | 13.67 | 62 | 162.80 | 102.30 | 6.80 | 98.61 | 0.69 | 9.15 | -0.60 |
| 16 | 0.050 | 5.60 | 15.90 | 60 | No Data | No Data | 8.40 | 99.11 | 0.79 | 10.65 | -0.42 |
| 17 | 0.050 | 5.48 | 13.94 | 57 | No Data | No Data | 8.60 | 99.15 | 1.05 | 10.09 | -2.95 |
| 18 | 0.050 | 6.00 | 15.07 | 54 | No Data | No Data | 7.50 | 99.03 | 1.22 | 12.23 | -1.37 |
| 19 | 0.051 | 4.90 | 16.20 | 61 | No Data | No Data | 7.80 | 98.79 | 0.79 | 9.50 | -0.72 |
| 20 | 0.051 | 5.28 | 16.64 | 60 | No Data | No Data | 7.30 | 99.00 | 1.01 | 8.38 | -2.55 |
| 21 | 0.049 | 5.40 | 17.79 | 56 | No Data | No Data | 6.60 | 99.04 | 1.11 | 14.91 | -0.96 |
| 22 | 0.049 | 4.91 | 15.34 | 65 | 162.70 | 124.50 | 8.30 | 99.24 | 0.78 | 9.18 | -0.41 |
| 23 | 0.048 | 4.60 | 15.20 | 59 | No Data | No Data | 8.20 | 98.98 | 0.95 | 12.34 | 1.22 |
| 24 | 0.049 | 5.34 | 16.32 | 55 | No Data | No Data | 8.70 | 99.04 | 1.02 | 10.55 | -2.43 |
| 25 | 0.048 | 6.09 | 22.14 | 51 | No Data | No Data | 7.90 | 99.06 | 1.31 | 12.83 | -1.28 |
| 26 | 0.049 | 4.60 | 15.20 | 60 | No Data | No Data | 7.90 | 99.54 | 0.71 | 10.63 | 0.01 |
| 27 | 0.049 | 5.85 | 18.58 | 58 | No Data | No Data | 7.60 | 99.39 | 0.73 | 8.06 | -2.65 |
| 28 | 0.051 | 5.63 | 19.24 | 56 | No Data | No Data | 7.20 | 99.27 | 1.22 | 10.81 | -0.86 |

FIG. 5C

| Vehicle | | | | | Vibration magnitudes (ms-2 r.m.s.) | | SEAT Value | | SEAT Transfer Function Value | | | |
|---|---|---|---|---|---|---|---|---|---|---|---|---|
| Number | Category | Type of seat | Speed (km/h) | Terrain | floor | seat | Traditional Foam Seating | E960 Foam | Traditional Foam With 5% Soy | Traditional Foam With 30% Soy | E960 With 5% Soy |
| 62 | armored vehicle | foam | 20 | cross-country | 1.066 | 0.784 | 75.5 | 65.5 | 73.99 | 66.44 | 64.19 |
| 63 | armored vehicle | foam | 28 | concrete | 1.728 | 0.722 | 42.7 | 37.7 | 41.846 | 37.576 | 36.946 |
| 92 | armored vehicle | foam | 20 | gravel | 0.32 | 0.154 | 49.6 | 39.6 | 48.608 | 43.648 | 38.808 |
| 93 | armored vehicle | foam | 20 | gravel | 0.486 | 0.462 | 95.9 | 85.9 | 93.982 | 84.392 | 84.182 |
| 69 | bus | suspension | 64 | tarmac | 0.309 | 0.329 | 108.4 | 105.4 | 106.232 | 95.392 | 103.292 |
| 70 | bus | foam, spring | 80 | tarmac | 0.706 | 0.498 | 67.2 | 64.2 | 65.856 | 59.136 | 62.916 |
| 71 | bus | foam, spring | 48-80 | tarmac | 0.482 | 0.454 | 87.1 | 84.1 | 85.358 | 76.648 | 82.418 |
| 72 | bus | foam | variable | tarmac | 0.463 | 0.499 | 102.2 | 97.2 | 100.156 | 89.936 | 95.256 |
| 86 | bus | foam | variable | concrete | 0.513 | 0.614 | 115.7 | 110.7 | 113.386 | 101.816 | 108.486 |
| 87 | bus | suspension | variable | tarmac | 0.664 | 0.592 | 88.7 | 85.7 | 86.926 | 78.056 | 83.986 |
| 88 | bus | foam, spring | variable | tarmac | 0.77 | 0.711 | 86.5 | 83.5 | 84.77 | 76.12 | 81.83 |
| 94 | bus | foam | variable | tarmac | 0.572 | 0.568 | 93.8 | 83.8 | 91.924 | 82.544 | 82.124 |
| 95 | bus | suspension | variable | tarmac | 0.391 | 0.381 | 87.7 | 84.7 | 85.946 | 77.176 | 83.006 |
| 96 | bus | foam, spring | 96 | tarmac | 0.487 | 0.389 | 73.5 | 70.5 | 72.03 | 64.68 | 69.09 |
| 1 | car | foam | variable | tarmac | 0.563 | 0.526 | 91.8 | 86.8 | 89.964 | 80.784 | 85.064 |
| 33 | car | foam, spring | variable | tarmac | 0.473 | 0.462 | 96.1 | 93.1 | 94.178 | 84.568 | 91.238 |
| 38 | car | foam | 113 | tarmac | 0.515 | 0.394 | 73.7 | 68.7 | 72.226 | 64.856 | 67.326 |
| 39 | car | foam | 113 | tarmac | 0.311 | 0.255 | 82.1 | 77.1 | 80.458 | 72.248 | 75.558 |
| 40 | car | foam | 113 | tarmac | 0.276 | 0.249 | 92.3 | 87.3 | 90.454 | 81.224 | 85.554 |
| 48 | car | foam | 48 | tarmac | 0.531 | 0.383 | 71.2 | 66.2 | 69.776 | 62.656 | 64.876 |
| 49 | car | foam | 100 | concrete | 0.441 | 0.333 | 78.4 | 73.4 | 76.832 | 68.992 | 71.932 |
| 51 | car | foam | 24 | tarmac | 0.398 | 0.499 | 114.1 | 109.1 | 111.818 | 100.408 | 106.918 |
| 52 | car | foam | 96 | tarmac | 0.359 | 0.23 | 64.7 | 59.7 | 63.406 | 56.936 | 58.506 |
| 53 | car | foam | 80 | tarmac | 0.26 | 0.187 | 70.8 | 65.8 | 69.384 | 62.304 | 64.484 |
| 54 | car | foam | 16 | tarmac | 0.165 | 0.17 | 105.7 | 100.7 | 103.586 | 93.016 | 98.686 |
| 55 | car | foam | 32 | tarmac | 0.376 | 0.307 | 78 | 73 | 76.44 | 68.64 | 71.54 |
| 56 | car | foam | 32 | tarmac | 0.462 | 0.3 | 61.5 | 56.5 | 60.27 | 54.12 | 55.37 |
| 57 | car | foam | 48 | tarmac | 0.489 | 0.563 | 113.4 | 108.4 | 111.132 | 99.792 | 106.232 |
| 59 | car | foam | 112 | concrete | 0.636 | 0.589 | 91.6 | 86.6 | 89.768 | 80.608 | 84.868 |

FIG. 6A

| Vehicle | | | | | Vibration magnitudes (ms-2 r.m.s.) | | SEAT Value | | SEAT Transfer Function Value | | | |
|---|---|---|---|---|---|---|---|---|---|---|---|---|
| Number | Category | Type of seat | Speed (km/h) | Terrain | floor | seat | Traditional Foam Seating | E960 Foam | Traditional Foam With 5% Soy | Traditional Foam With 30% Soy | E960 With 5% Soy |
| 77 | car | foam | variable | tarmac | 0.375 | 0.393 | 98.2 | 93.2 | 96.236 | 86.416 | 91.336 |
| 78 | car | foam | 48 | tarmac | 0.82 | 0.83 | 100.5 | 95.5 | 98.49 | 88.44 | 93.59 |
| 79 | car | foam | 96 | tarmac | 0.419 | 0.324 | 75 | 70 | 73.5 | 66 | 68.6 |
| 80 | car | foam | 48 | tarmac | 0.801 | 0.702 | 85.5 | 80.5 | 83.79 | 75.24 | 78.89 |
| 97 | car | foam | 113 | tarmac | 0.503 | 0.32 | 59.7 | 49.7 | 58.506 | 52.536 | 48.706 |
| 98 | car | foam | 113 | concrete | 0.459 | 0.36 | 84.9 | 74.9 | 83.202 | 74.712 | 73.402 |
| 99 | car | foam | 113 | concrete | 0.548 | 0.445 | 80.1 | 70.1 | 78.498 | 70.488 | 68.698 |
| 100 | car | foam | 113 | concrete | 0.643 | 0.436 | 66.4 | 56.4 | 65.072 | 58.432 | 55.272 |
| 3 | dump truck | suspension | variable | mud, soil | 0.701 | 0.583 | 96.5 | 93.5 | 94.57 | 84.92 | 91.63 |
| 34 | dump truck | foam | variable | mud soil | 1.24 | 1.333 | 107.9 | 97.9 | 105.742 | 94.952 | 95.942 |
| 67 | dump truck | suspension | variable | tarmac | 0.974 | 0.655 | 65.3 | 62.3 | 63.994 | 57.464 | 61.054 |
| 61 | dump truck | foam | variable | tarmac | 0.908 | 1.437 | 209 | 204 | 204.82 | 183.92 | 199.92 |
| 2 | excavator | foam | stationary | digging soil | 0.114 | 0.097 | 78.1 | 73.1 | 76.538 | 68.728 | 71.638 |
| 4 | excavator | foam | 4 | tarmac | 1.703 | 0.816 | 49.2 | 44.2 | 48.216 | 43.296 | 43.316 |
| 5 | excavator | suspension | 4 | tarmac | 2.002 | 1.005 | 48.4 | 45.4 | 47.432 | 42.592 | 44.492 |
| 66 | excavator | suspension | variable | dirt track | 2.619 | 3.033 | 105.6 | 100.6 | 103.488 | 92.928 | 98.588 |
| 35 | fire engine | foam, spring | variable | gravel, soil | 0.961 | 1.025 | 105.5 | 100.5 | 103.39 | 92.84 | 98.49 |
| 36 | fire engine | foam | 48-64 | tarmac | 0.752 | 0.701 | 90.3 | 85.3 | 88.494 | 79.464 | 83.594 |
| 37 | fire engine | foam | 48 | tarmac | 0.433 | 0.446 | 102.8 | 97.8 | 100.744 | 90.464 | 95.844 |
| 68 | helicopter | foam | variable | flying | 0.579 | 1.454 | 237.5 | 217.5 | 232.75 | 209 | 213.15 |
| 12 | lawn mower | foam, leaf | variable | tarmac | 0.391 | 0.419 | 107.7 | 97.7 | 105.546 | 94.776 | 95.746 |
| 6 | lift truck | foam | variable | tarmac | 0.964 | 0.898 | 93.9 | 88.9 | 92.022 | 82.632 | 87.122 |
| 7 | lift truck | foam | variable | tarmac | 0.878 | 1.028 | 118.1 | 108.1 | 115.738 | 103.928 | 105.938 |
| 28 | lift truck | foam | variable | tarmac, concrete | 1.136 | 0.688 | 48.8 | 43.8 | 47.824 | 42.944 | 42.924 |
| 90 | lift truck | foam | variable | tarmac | 0.624 | 0.544 | 84.3 | 74.3 | 82.614 | 74.184 | 72.814 |
| 91 | lift truck | foam, pivoted | variable | tarmac | 0.891 | 0.707 | 78.6 | 68.6 | 77.028 | 69.168 | 67.228 |
| 20 | milk float | foam | variable | tarmac, concrete | 0.866 | 0.888 | 103.1 | 98.1 | 101.038 | 90.728 | 96.138 |
| 21 | milk float | foam | variable | tarmac, concrete | 0.758 | 0.69 | 77.6 | 72.6 | 76.048 | 68.288 | 71.148 |
| 22 | milk float | foam | variable | tarmac | 0.862 | 0.894 | 105.4 | 100.4 | 103.292 | 92.752 | 98.392 |
| 41 | mobile crane | suspension | 26 | concrete, paving | 0.648 | 0.536 | 76.2 | 73.2 | 74.676 | 67.056 | 71.736 |
| 50 | mobile crane | suspension | 17-19 | tarmac, concrete | 0.429 | 0.409 | 90 | 87 | 88.2 | 79.2 | 85.26 |
| 16 | semi truck | suspension | 64 | tarmac, concrete | 0.508 | 0.425 | 76.1 | 73.1 | 74.578 | 66.968 | 71.638 |

FIG. 6B

| Vehicle | | | | | Vibration magnitudes (ms-2 r.m.s.) | | SEAT Value | | SEAT Transfer Function Value | | |
|---|---|---|---|---|---|---|---|---|---|---|---|
| Number | Category | Type of seat | Speed (km/h) | Terrain | floor | seat | Traditional Foam Seating | E960 Foam | Traditional Foam With 5% Soy | Traditional Foam With 30% Soy | E960 With 5% Soy |
| 17 | semi truck | suspension | 64 | tarmac, concrete | 0.459 | 0.433 | 85.5 | 82.5 | 83.79 | 75.24 | 80.85 |
| 42 | semi truck | suspension | variable | tarmac | 0.719 | 0.366 | 45.9 | 42.9 | 44.982 | 40.392 | 42.042 |
| 43 | semi truck | suspension | 64 | tarmac | 0.736 | 0.414 | 56.7 | 53.7 | 55.566 | 49.896 | 52.626 |
| 44 | semi truck | suspension | 80 | concrete | 1.136 | 0.54 | 49.2 | 46.2 | 48.216 | 43.296 | 45.276 |
| 45 | semi truck | suspension | 80 | concrete | 0.471 | 0.565 | 126 | 123 | 123.48 | 110.88 | 120.54 |
| 46 | semi truck | suspension | 80 | concrete | 0.463 | 0.55 | 126 | 123 | 123.48 | 110.88 | 120.54 |
| 47 | semi truck | suspension | 64 | tarmac | 0.508 | 0.475 | 97.8 | 94.8 | 95.844 | 86.064 | 92.904 |
| 83 | semi truck | suspension | variable | concrete | 0.72 | 0.594 | 73.4 | 70.4 | 71.932 | 64.592 | 68.992 |
| 29 | SUV | foam | variable | tarmac | 0.441 | 0.433 | 96.1 | 91.1 | 94.178 | 84.568 | 89.278 |
| 30 | SUV | foam | variable | tarmac | 0.307 | 0.312 | 98.7 | 93.7 | 96.726 | 86.856 | 91.826 |
| 8 | tractor | suspension | 8 | grass | 0.429 | 0.34 | 71.7 | 68.7 | 70.266 | 63.096 | 67.326 |
| 13 | tractor | foam | variable | tarmac | 0.598 | 0.68 | 114.4 | 109.4 | 112.112 | 100.672 | 107.212 |
| 14 | tractor | suspension | 28 | grass | 0.619 | 0.526 | 77.7 | 74.7 | 76.146 | 68.376 | 73.206 |
| 15 | tractor | suspension | mowing | grass | 0.444 | 0.525 | 114.8 | 111.8 | 112.504 | 101.024 | 109.564 |
| 58 | tractor | suspension | variable | tarmac | 1.779 | 1.068 | 77.6 | 74.6 | 76.048 | 68.288 | 73.108 |
| 60 | tractor | foam | variable | tarmac | 0.701 | 0.88 | 123.7 | 118.7 | 121.226 | 108.856 | 116.326 |
| 84 | tractor | suspension | variable | uneven tarmac | 0.686 | 0.543 | 68.8 | 65.8 | 67.424 | 60.544 | 64.484 |
| 10 | truck | foam, spring | 48 | tarmac | 0.86 | 0.641 | 70.9 | 67.9 | 69.482 | 62.392 | 66.542 |
| 25 | truck | suspension | variable | tarmac | 0.817 | 0.918 | 119.8 | 116.8 | 117.404 | 105.424 | 114.464 |
| 27 | truck | suspension | variable | tarmac | 0.927 | 1.071 | 115.7 | 112.7 | 113.386 | 101.816 | 110.446 |
| 31 | truck | foam, spring | variable | tarmac | 0.619 | 0.446 | 66.9 | 63.9 | 65.562 | 58.872 | 62.622 |
| 11 | van | foam | 112 | tarmac | 0.423 | 0.329 | 76.9 | 66.9 | 75.362 | 67.672 | 65.562 |
| 18 | van | foam, spring | variable | tarmac | 0.462 | 0.453 | 87.7 | 84.7 | 85.946 | 77.176 | 83.006 |
| 32 | van | foam, spring | variable | tarmac | 0.468 | 0.45 | 98.7 | 95.7 | 96.726 | 86.856 | 93.786 |
| 64 | van | foam | 64 | tarmac | 0.474 | 0.447 | 90.6 | 85.6 | 88.788 | 79.728 | 83.888 |
| 73 | van | foam | >48 | tarmac | 0.46 | 0.363 | 72.4 | 67.4 | 70.952 | 63.712 | 66.052 |
| 74 | van | foam | 48 | tarmac | 0.51 | 0.522 | 101.6 | 96.6 | 99.568 | 89.408 | 94.668 |
| 75 | van | foam | 64 | tarmac | 0.622 | 0.589 | 91.8 | 86.8 | 89.964 | 80.784 | 85.064 |
| 76 | van | foam | variable | tarmac | 0.398 | 0.325 | 77 | 72 | 75.46 | 67.76 | 70.56 |
| 85 | van | foam, spring | 88 | tarmac | 0.558 | 0.482 | 89.7 | 86.7 | 87.906 | 78.936 | 84.966 |

FIG. 6C

| Sample ID | Code | Description | Formulation |||||||
|---|---|---|---|---|---|---|---|---|---|
| | | | Petrol-based Base Polyol | Soy-based Base Polyol | % Solid | % Soy | % Water | Isocyanate | |
| HB-092007-12 | TMX-7 | Control - no soy no starch | 833 | - | 0 | 6.5 | 2.6 | TDI | |
| HB-092007-13 | TMX-7 | Control - no soy no starch | 833 | - | 0 | 6.5 | 2.6 | TDI | |
| HB-092007-10 | TMX-6 | Control - 10 parts soy | 833 | Agrol 3.6 | 0 | 6.3 | 2.5 | TDI | |
| HB-092007-11 | TMX-6 | Control - 10 parts soy | 833 | Agrol 3.6 | 0 | 6.3 | 2.5 | TDI | |
| HB-091707-8 | TMX-5 | 9 parts soy 1 part starch | 833 | Agrol 3.6 | 0.63 | 5.6 | 2.5 | TDI | |
| HB-091707-9 | TMX-5 | 9 parts soy 1 part starch | 833 | Agrol 3.6 | 0.63 | 5.6 | 2.5 | TDI | |

| Sample ID | Code | Formulation Details - PPH Polyol |||||||||
|---|---|---|---|---|---|---|---|---|---|---|
| | | Petrol-based Base Polyol | Soy-based Base Polyol | Starch | Urea | Water | Cross-linker | Catalysts | Surfactants | Poly:Iso Ratio |
| HB-092007-12 | TMX-7 | 100 | 0 | 0 | 0 | 3.93 | 1.275 | 0.417 | 1.15 | 2.315 |
| HB-092007-13 | TMX-7 | 100 | 0 | 0 | 0 | 3.93 | 1.275 | 0.417 | 1.15 | 2.315 |
| HB-092007-10 | TMX-6 | 90 | 10 | 0 | 0 | 3.93 | 1.275 | 0.417 | 1.15 | 2.012 |
| HB-092007-11 | TMX-6 | 90 | 10 | 0 | 0 | 3.93 | 1.275 | 0.417 | 1.15 | 2.012 |
| HB-091707-8 | TMX-5 | 90 | 9 | 1 | 0 | 3.93 | 1.275 | 0.417 | 1.15 | 2.04 |
| HB-091707-9 | TMX-5 | 90 | 9 | 1 | 0 | 3.93 | 1.275 | 0.417 | 1.15 | 2.04 |

FIG. 11A

| Sample ID | Code | IFD | | SCO-B Hysteresis | | Transmissivity | | | | |
|---|---|---|---|---|---|---|---|---|---|---|
| | | 25% Corr (N) | 50% Corr (N) | 20mm Corr (N) | Hyst Loss (%) | Nat. Freq | Peak Trans | Attenuation Freq | Trans@ 6Hz | Comfort Value |
| HB-092007-12 | TMX-7 | 94.25 | 179.03 | 91.4 | 23.7 | 4.71 | 5.82 | 7.59 | 2.37 | 27.41 |
| HB-092007-13 | TMX-7 | 91.66 | 174.48 | 90.26 | 23.99 | 4.85 | 5.01 | 7.76 | 2.46 | 24.30 |
| HB-092007-10 | TMX-6 | 108.74 | 217.52 | 108.72 | 31.4 | 4.39 | 6.78 | 7.35 | 1.96 | 29.76 |
| HB-092007-11 | TMX-6 | 114.57 | 222.08 | 112.87 | 30.74 | 4.17 | 7.26 | 7.1 | 1.73 | 30.27 |
| HB-091707-8 | TMX-5 | 120.08 | 226.57 | 119.58 | 31.35 | 4.15 | 7.12 | 7.03 | 1.66 | 29.55 |
| HB-091707-9 | TMX-5 | 121.78 | 234.1 | 120.71 | 31.19 | 4.03 | 6.42 | 6.76 | 1.44 | 25.87 |

FIG. 11B

| Sample ID | Code | Description | Formulation | | | | | |
|---|---|---|---|---|---|---|---|---|
| | | | Petrol-based Base Polyol | Soy-based Base Polyol | % Solid | % Soy | % Water | Isocyanate |
| HB-092007-12 | TMX-7 | Control - no soy no starch | 833 | - | 0 | 6.5 | 2.6 | TDI |
| HB-092007-13 | TMX-7 | Control - no soy no starch | 833 | - | 0 | 6.5 | 2.6 | TDI |
| HB-092007-14 | TMX-8 | 10 Parts soy 25% Urea and 75% water | 833 | Agrol 3.6 | 0.77 | 6.2 | 2.4 | TDI |
| HB-092007-15 | TMX-8 | 10 Parts soy 25% Urea and 75% water | 833 | Agrol 3.6 | 0.77 | 6.2 | 2.4 | TDI |

| Sample ID | Code | Formulation Details - PPH Polyol | | | | | | | | |
|---|---|---|---|---|---|---|---|---|---|---|
| | | Petrol-based Base Polyol | Soy-based Base Polyol | Starch | Urea | Water | Cross-linker | Catalysts | Surfactants | Poly:Iso Ratio |
| HB-092007-12 | TMX-7 | 100 | 0 | 0 | 0 | 3.93 | 1.275 | 0.417 | 1.15 | 2.315 |
| HB-092007-13 | TMX-7 | 100 | 0 | 0 | 0 | 3.93 | 1.275 | 0.417 | 1.15 | 2.315 |
| HB-092007-14 | TMX-8 | 90 | 10 | 0 | 1.24 | 3.93 | 1.275 | 0.417 | 1.15 | 2.031 |
| HB-092007-15 | TMX-8 | 90 | 10 | 0 | 1.24 | 3.93 | 1.275 | 0.417 | 1.15 | 2.031 |

FIG. 11C

| Sample ID | Code | IFD | | SCO-B Hysteresis | | Transmissivity | | | | |
|---|---|---|---|---|---|---|---|---|---|---|
| | | 25% Corr (N) | 50% Corr (N) | 20mm Corr (N) | Hyst Loss (%) | Nat. Freq | Peak Trans | Attenuation Freq | Trans@ 6Hz | Comfort Value |
| HB-092007-12 | TMX-7 | 94.25 | 179.03 | 91.4 | 23.7 | 4.7 | 5.82 | 7.59 | 2.37 | 27.41 |
| HB-092007-13 | TMX-7 | 91.66 | 174.48 | 90.26 | 23.99 | 4.9 | 5.01 | 7.76 | 2.46 | 24.30 |
| HB-092007-14 | TMX-8 | 109.1 | 213.93 | 110.05 | 32.76 | 4.6 | 5.93 | 7.68 | 2.31 | 27.04 |
| HB-092007-15 | TMX-8 | 112.75 | 223.02 | 115.78 | 32.9 | 4.5 | 5.56 | 7.51 | 2.1 | 25.02 |

FIG. 11D

| | | Formulation | | | | | |
|---|---|---|---|---|---|---|---|
| Sample ID | Description | Conventional Base Polyol | Soy Cell Opener | % Solid | % Soy | % Water | Isocyanate |
| 091907-1 | Control | 833 | R3-170-G | 0 | 0 | 3.41 | TDI |
| 091907-2 | 0.5 pph | 833 | R3-170-G | 0 | 0.47 | 3.41 | TDI |
| 091907-3 | 1.0 pph | 833 | R3-170-G | 0 | 0.94 | 3.41 | TDI |
| 091907-4 | 1.5 pph | 833 | R3-170-G | 0 | 1.41 | 3.41 | TDI |
| 091907-5 | 2.0 pph | 833 | R3-170-G | 0 | 1.88 | 3.41 | TDI |
| 091907-6 | 3.0 pph | 833 | R3-170-G | 0 | 2.82 | 3.41 | TDI |
| 091907-7 | 4.0 pph | 833 | R3-170-G | 0 | 3.77 | 3.41 | TDI |

| | | Formulation Details - PPH Polyol | | | | | | |
|---|---|---|---|---|---|---|---|---|
| Sample ID | Description | Conventional Base Polyol | Soy Cell Opener | Water | Cross-linker | Catalysts | Surfactants | Poly:Iso Ratio |
| 091907-1 | Control | 100 | 0 | 3.93 | 1.275 | 0.399 | 0.7 | 2.296 |
| 091907-2 | 0.5 pph | 99.5 | 0.5 | 3.93 | 1.275 | 0.399 | 0.7 | 2.291 |
| 091907-3 | 1.0 pph | 99 | 1 | 3.93 | 1.275 | 0.399 | 0.7 | 2.286 |
| 091907-4 | 1.5 pph | 98.5 | 1.5 | 3.93 | 1.275 | 0.399 | 0.7 | 2.281 |
| 091907-5 | 2.0 pph | 98 | 2 | 3.93 | 1.275 | 0.399 | 0.7 | 2.276 |
| 091907-6 | 3.0 pph | 97 | 3 | 3.93 | 1.275 | 0.399 | 0.7 | 2.266 |
| 091907-7 | 4.0 pph | 96 | 4 | 3.93 | 1.275 | 0.399 | 0.7 | 2.256 |

| | | IFD | | SCO-B Hysteresis | |
|---|---|---|---|---|---|
| | | 25% | 50% | 20mm | Hyst |
| Sample ID | Description | Corr (N) | Corr (N) | Corr (N) | Loss (%) |
| 091907-1 | Control | 94.58 | 175.03 | 84.73 | 24.4 |
| 091907-2 | 0.5 pph | 93.72 | 171.16 | 82.75 | 23.24 |
| 091907-3 | 1.0 pph | 110.36 | 190.54 | 98.68 | 23.38 |
| 091907-4 | 1.5 pph | 119.94 | 205.11 | 107.77 | 24.37 |
| 091907-5 | 2.0 pph | 126.14 | 215.61 | 113.67 | 25.23 |
| 091907-6 | 3.0 pph | 123.1 | 220.07 | 111.39 | 26.38 |
| 091907-7 | 4.0 pph | 146.14 | 257.35 | 134.29 | 26.64 |

| | | Transmissivity | | | | |
|---|---|---|---|---|---|---|
| Sample ID | Description | Nat Freq | Peak Trans | Attenuation Freq | Trans @6Hz | Comfort |
| 091907-1 | Control | 4.61 | 7.62 | 7.94 | 2.64 | 35.13 |
| 091907-2 | 0.5 pph | 4.63 | 6.8 | 7.84 | 2.5 | 31.48 |
| 091907-3 | 1.0 pph | 4.31 | 7.66 | 7.32 | 1.99 | 33.01 |
| 091907-4 | 1.5 pph | 4.23 | 7.13 | 7.35 | 1.93 | 30.16 |
| 091907-5 | 2.0 pph | 4.15 | 7.03 | 7.16 | 1.75 | 29.17 |
| 091907-6 | 3.0 pph | 4.01 | 6.78 | 6.96 | 1.56 | 27.19 |
| 091907-7 | 4.0 pph | 3.76 | 7.08 | 6.39 | 1.17 | 26.62 |

FIG. 15

| Formulation - PPH | | | | IFD | | | Transmissibility (Constant Acceleration) | | | | | Hysteresis | | |
|---|---|---|---|---|---|---|---|---|---|---|---|---|---|---|
| Petrol Oil-based Base Polyol | Plant Oil-based Base Polyol | Weight (g) | Height (mm) | Force at 25% (kgf) | Force at 50% (kgf) | Nat Freq (Hz) | Peak Transmiss | Attenu Freq (Hz) | Transmiss at 6Hz | NatFreq x PeakTrans x AttenFreq | Force at 15mm (N) | Force at 20mm (N) | Force at 25mm (N) | Hysteresis Loss (%) |
| 100.00 | 0.00 | 872 | 97.06 | 148.49 | 279.96 | 3.81 | 5.97 | 6.26 | 1.14 | 142.18 | 113.37 | 136.27 | 159.37 | 25.31 |
| 70.00 | 30.00 | 874 | 94.85 | 155.20 | 302.84 | 4.20 | 4.46 | 6.90 | 1.53 | 129.39 | 127.01 | 152.12 | 178.57 | 31.93 |

FIG. 18

| Formulation - PPH | | | | | Core Ball Rebound (%) | Tensile Strength (kPa) | Elongation (%) | Tear Resistance (N/m) | Glass Fogging (Fog %) | Repeat Compression | | | |
|---|---|---|---|---|---|---|---|---|---|---|---|---|---|
| Petrol Oil-based Base Polyol | Plant Oil-based Base Polyol | Core Density (g/cm³) | 50% Dry Set (%) | 50% Wet Set (%) | | | | | | Height (% Loss) | 25% (% Loss) | 50% (% Loss) | |
| 100.00 | 0.00 | 0.051 | 15.6% | 10.9% | 59 | 95.1 | 83.8 | 469.9 | 99.83 | 0.86% | 9.73% | -2.33% | |
| 70.00 | 30.00 | 0.056 | 16.4% | 11.6% | 46 | 115.8 | 90.0 | 589.9 | 96.37 | 1.16% | 11.31% | -1.89% | |

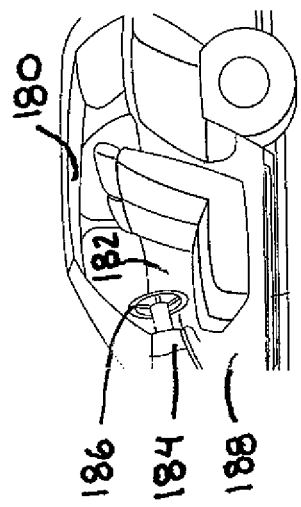

FIG. 19

NOP FOAM

CROSS-REFERENCE TO RELATED PATENT APPLICATION

This Application claims the benefit of U.S. Provisional Application No. 60/855,153, entitled NON-PETROLEUM BASED POLYOL FOAM PRODUCTS, and filed Oct. 30, 2006, the content of which is incorporated herein by reference in its entirety.

BACKGROUND

The present disclosure relates to open cell, polyurethane foam material components having non-petroleum based polyol material and methods for making products including such open cell, polyurethane foam material. The present disclosure relates particularly to open cell, polyurethane foam formulation having a plant oil-based polyol portion and a petrochemical-based polyol portion and to a method for producing foam articles for use in seating applications as cushioning material having improved performance specifications.

It is generally known to provide a foam cushion for the comfort of an occupant of a seat, whether the seat is a piece of furniture, a piece of equipment, or a vehicle, such as an automobile. It is also generally known to formulate the constituent parts of the foam for such a cushion from petroleum oil-based polyurethane material that is reacted with other products to make a relatively soft foam cushion product. Such foam product may be formulated to be relatively soft yet supportive to provide a relatively high comfort level (i.e., support, feel, and isolation to vibration) for an occupant. For many applications there has long persisted an ongoing desire to provide a soft or flexible foam while meeting performance specifications for dampening vibration (isolating) to an occupant. It is also generally known to provide a harder or more firm flexible foam, including a foam having a higher density, in a vehicle seat cushion material to better dampen (isolate) road vibration from the occupant (also known as dynamic comfort). However, such firm foams may provide less "cushion" and comfort (including worse pressure distribution, known as static comfort), particularly over a longer period of time relative to such softer or more flexible foam.

It is known to derive and utilize materials in the foam formulation process from renewable sources such as soybean oils and other plant oils. However, despite such long held knowledge, there remains a lack of commercially viable foam product in seating applications utilizing any meaningful amount of plant-based source material instead of petroleum oil-based material because it has been unknown how to produce foam products that will meet performance specifications and requirements for such seating applications.

Accordingly, there is, and there remains, a significant need to provide a plant oil-based polyurethane foam that can meet the specification requirements for use in the seating applications, particularly for dynamic and static comfort, in various seating applications, including in particular in the automotive industry. Further, it would be advantageous to have a plant oil-based polyurethane foam material capable of meeting and exceeding performance specifications equal or greater than those for existing petroleum oil-based polyurethane foam material used in such seating applications.

SUMMARY

In one exemplary embodiment, an open cell, polyurethane foam material is provided from the reaction products of a polyol material including a vegetable oil (soybean oil)-based polyol present in the polyol in an amount of between 5 and 30 parts per hundred polyol, an isocyanate, a blowing agent, and a crosslinker catalyst and surfactant and cell opener; wherein the polyol material preferably has a functionality of between 2.3 and 2.9 and most preferably 2.7 to provide a foam material having an improved transmissibility particularly well suited for seating applications such as in an automotive vehicle seat and improved as compared to a petroleum oil only polyol formulation and a vegetable oil only polyol formulation.

In one exemplary embodiment, an open cell, polyurethane foam material is provided by the reaction product of a base polyol including a plant oil-based polyol of between 5 and 30 parts per hundred polyol; an isocyanate; water; a surfactant; and a crosslinker, and the base polyol has a functionality of 2.3 to 2.9 and sorbitol is added to the base polyol to form a copolymer polyol having a functionality of between 2.2 and 3.8 for making a foam material having an improved transmissibility performance.

One exemplary embodiment relates to the formulation of a polyurethane foam material including at least a substantial portion of a non-petroleum-based polymer polyol material for use in components in a vehicle seat and having at least substantially equivalent performance specifications as compared to known polyurethane foam materials. In the one embodiment, the non-petroleum-based polymer polyol is preferably made from natural, more readily renewable resources such as plant oils including but not limited to soybean oil. In the one exemplary embodiment, greater than approximately five percent of the content of the foam material is from non-petroleum-based content. Even more particularly, in the one embodiment, at least approximately fifteen percent of the content of the foam material is from non-petroleum-based polymer content. Even more particularly, in another embodiment, at least approximately twenty percent of the content of the foam material is from non-petroleum-based polymer content.

One exemplary embodiment relates to a polymer for use in making a foam material developed using a base polyol material including a non-petroleum-based polymer materials. More particularly, the base polyol includes a polyol derived from soybean oil. In one exemplary embodiment, a polymer for use in making a foam material is developed using a copolymer polyol including a non-petroleum-based polymer material. More particularly in the one exemplary embodiment, the base polyol having the non-petroleum-based polyol material is used in making the copolymer polyol and includes polyol material derived from plant oil, in particular vegetable oils such as soybean oil.

In another exemplary embodiment, a polymer material is developed using a small-chain polyol in producing a non-petroleum, plant oil-based polymer polyol material for use in creating the foam material. More particularly, in the one exemplary embodiment, a polymer polyol material is developed using a small-chain polyol to replace a petroleum-based diluent in a surfactant used in producing the non-petroleum-based polymer material for use in making a foam material.

In one exemplary embodiment, a non-petroleum based polymer material for use as a base polyol in making a foam material is derived from non-petroleum plant derived material, such as but not limited to soybean oil, and is processed using an ethylene oxide capping step using either potassium hydroxide (which is most preferable) or sodium hydroxide to increase the molecular weight of the base polyol.

The higher molecular weight base polyol preferably has approximately forty to fifty percent non-petroleum based polymer material and more preferably has approximately sixty to eighty-five percent non-petroleum based polymer material and most preferably has approximately fifty to ninety percent non-petroleum based polymer material.

In one exemplary embodiment, non-petroleum based polymer material for use as a base polyol in making a foam material is preferably derived from a plant oil, such as but not limited to soybean, and is processed by adding a propylene oxide to the base polyol to increase its molecular weight. The higher molecular weight base polyol material preferably has approximately forty to fifty percent non-petroleum based polymer material and more preferably has approximately sixty to eighty-five percent non-petroleum based polymer material and most preferably has approximately fifty to ninety percent non-petroleum based polymer material.

In one exemplary embodiment, a polymer polyol blend includes a copolymer polyol material including a non-petroleum based polyol developed using naturally derived urea material. In the one exemplary embodiment, urea is derived from a group of materials including hydrazine, Toluene diisocyanate (TDI) and naturally occurring sources including organic waste byproducts from animals. More particularly, in the one exemplary embodiment, the copolymer polyol material is preferably between ten and one hundred percent derived from non-petroleum based polyol. In the one exemplary embodiment, preferably approximately twenty to fifty percent of the copolymer polyol is made from non-petroleum based polyol material and more preferably approximately thirty to fifty percent of the base polyol is made from a non-petroleum based polyol material.

In one exemplary embodiment, a polymer polyol blend for use in making a foam material includes a base polyol material including a non-petroleum based polyol material. In the one embodiment, preferably approximately ten to sixty percent of the base polyol is made from a non-petroleum based polyol material, and more preferably approximately forty to seventy percent of the base polyol is made from a non-petroleum based polyol material and most preferably approximately sixty to one hundred percent of the base polyol is made from a non-petroleum based polyol material.

In particular, in the one exemplary embodiment, the amount of plant oil-based polymer polyol is limited by the amount of solids present in the copolymer polyol material and the resulting viscosity of the foam material and the mechanical limitations of the equipment used for manufacturing the foam material. In the one exemplary embodiment, the copolymer polyol material contains Styrene Acrylonitrile (SAN) between approximately forty percent and sixty percent and has a viscosity of approximately 6000 to 9000 centipoises (cps). In the one exemplary embodiment, the SAN includes between approximately forty and sixty percent styrene and inversely proportional amount of acrylonitrile. In another embodiment the copolymer polyol material contains SAN between approximately forty percent and sixty percent and has a viscosity of up to approximately 20000 cps.

In one exemplary embodiment, non-petroleum based polymer material for use as a base polyol in making a foam material is preferably derived from a plant material such as but not limited to soybean oil, and is processed by adding a propylene oxide to the base polyol to increase its molecular weight. In the one embodiment, styrene is added to the higher molecular weight base polyol material to produce a copolymer polyol material for use in making the foam material. In one alternate embodiment, acrylonitrile is used in place of the styrene to produce a copolymer polyol for use in making the foam material. In one embodiment, the higher molecular weight base polyol is combined with preferably a mixture of styrene and acrylonitrile wherein the mixture is preferably between approximately sixty percent styrene and forty percent acrylonitrile and further wherein the mixture is more preferably approximately fifty percent styrene and fifty percent acrylonitrile and further most preferably wherein the mixture is approximately forty percent styrene and sixty percent acrylonitrile.

In one exemplary embodiment, the resulting copolymer polyol has preferably between approximately ten to thirty percent non-petroleum based polymer material, more preferably has between approximately thirty to sixty percent non-petroleum based polymer material and most preferably has approximately between sixty to ninety percent non-petroleum based polymer material.

In one exemplary embodiment, non-petroleum based polymer material for use as a base polyol in making a foam material is preferably derived from plant material, such as but not limited to soybean oil, and is processed by adding a propylene oxide to the base polyol material to increase its molecular weight and then sorbitol is added and blended with a glycerin material to produce a copolymer polyol having a functionality of preferably between approximately 2.2 and 3.8 and more preferably of between approximately 2.8 and 3.2 and most preferably having a functionality of approximately 3.0 for use in making a foam material. Sucrose replaces the sorbitol and is added to the higher molecular weight base polyol and blended with a glycerin material to produce a copolymer polyol having a functionality of preferably between approximately 2.2 and 3.2, and more preferably of between approximately 2.8 and 3.2, and most preferably having a functionality of approximately 3.0 for use in making a foam material. In both embodiments, the resulting copolymer polyol has preferably between approximately forty to seventy percent non-petroleum based polymer material, more preferably has between approximately forty to eighty percent non-petroleum based polymer material and most preferably has approximately between forty to ninety percent non-petroleum based polymer material.

In one exemplary embodiment, a non-petroleum based polymer material for use as a base polyol in making a foam material is preferably derived from plant material, such as but not limited to soybean oil, and is processed by adding a low monol petroleum-based material to increase the molecular weight of the base polyol to obtain increased performance criteria, including to increase the durability and the dynamic and static comfort performance criteria.

In one exemplary embodiment, a non-petroleum based polymer material for use as a base polyol in making a foam material is derived from non-petroleum material, such as but not limited to soybean oil, and is selected to have both a functionality and molecule length to control the vibration input into the foam material to obtain a lower cost foam material having a vibration dampening characteristic similar to foam material based upon molecules from petroleum-based polyols. In the one embodiment, the non-petroleum based polymer material has a functionality between 1.0 to 6.0, preferable 1.3 to 1.9, and more preferably has a functionality between 2.3 to 2.7, and has corresponding hydroxyl numbers between 38 to 190, preferably between 110 to 95 and more preferably between 85 to 78 to provide a foam article for use in a seat cushion having a natural frequency preferably in the frequency range of 2 to 20 hertz and to dampen vibration inputs having a frequency of 2 Hz and above.

In one exemplary embodiment, a foam cushion of a vehicle seat includes a non-petroleum-based polymer foam material. In another exemplary embodiment, an armrest cushion of a vehicle includes a non-petroleum-based polymer foam material. In another exemplary embodiment, the headrest of the vehicle seat includes a non-petroleum-based polymer foam material. In another exemplary embodiment, the seat cover of the vehicle seat includes a non-petroleum-based polymer foam material.

Several exemplary embodiments are disclosed herein. However, it is to be understood that the disclosed embodiments are merely exemplary and may be embodied in various and alternative forms. Therefore, specific details disclosed herein are not to be interpreted as limiting, but merely as a representative basis for the claims and/or as a representative basis for teaching one of ordinary skill in the art. Accordingly, except for otherwise expressly stated, all numeral quantities in this description indicating amounts of material are to be understood as modified by the word "substantially" in describing the broadest scope supported herein it being understood that practice within the numerical limit is most preferred.

BRIEF DESCRIPTION OF THE DRAWINGS

The foregoing and other features of the exemplary embodiments will become more apparent to one of ordinary skill in the art upon consideration of the following detailed description and the accompanying drawings in which:

FIGS. 5A-5C are tables showing several physical properties and characteristics of foams formulated with several high-molecular weight petroleum oil-based polyol molecules mixed with various concentrations of soy oil-based polyol.

FIGS. 6A-6C are tables showing several physical properties and characteristics of a foam used for a seat in several exemplary vehicles under different load conditions.

FIGS. 11A-11D is a table showing physical properties and characteristics of a foam used corn starch and urea for building a copolymer polyol material for use in making a foam material.

FIG. 15 is a table showing several physical properties and characteristics of foams formulated with various concentrations of a soy-based cell-opener.

FIG. 18 is a data table of a plant oil-based polyol blend and a control formulation using MDI as the isocyanate.

FIG. 19 is a perspective view of a vehicle interior and its components incorporating a foam material having a plant oil-based polyol foam.

DETAILED DESCRIPTION

Polyurethane-based foam cushions may be formed according to a "one shot" process. In a one shot process, soft and firm polyurethane foams are typically formed from a mixture of a first (or polyol) stream and a second (or Isocyanate) stream. The polyurethane-based foam is typically composed of polyurethane-based base polyol resin, a polyurethane-based copolymer polyol resin (co-polyol) blowing agent, water, crosslinker a catalyst (or catalyst package), typically an isocyanate such as toluene diisocyanate (TDI) or methylene diphenyl diisocyanate (MDI) or any blend of TDI and MDI and a surfactant (package) cell opener. Typical blowing agents have included chloro fluro carbons, methylene chloride, trichloroethane, and water. The preferred blowing agent for this context is water. The polyol material stream is generally composed of polyurethane polymer optionally with a propylene oxide (PO) that may be manufactured with potassium hydroxide (KOH) and/or then ethylene oxide (EO) capped. Another method of manufacturing polyol material includes the use of Cobalt hydroxide and Zinc Hydroxide, cesium hydroxide, Iridium and rubidium hydroxide with dimetal catalyst. Such polyols may be made with or without EO capping. Another method of manufacturing polyol materials which are not EO capped relates to using heavy metal cyanide complexes.

Figure 1:
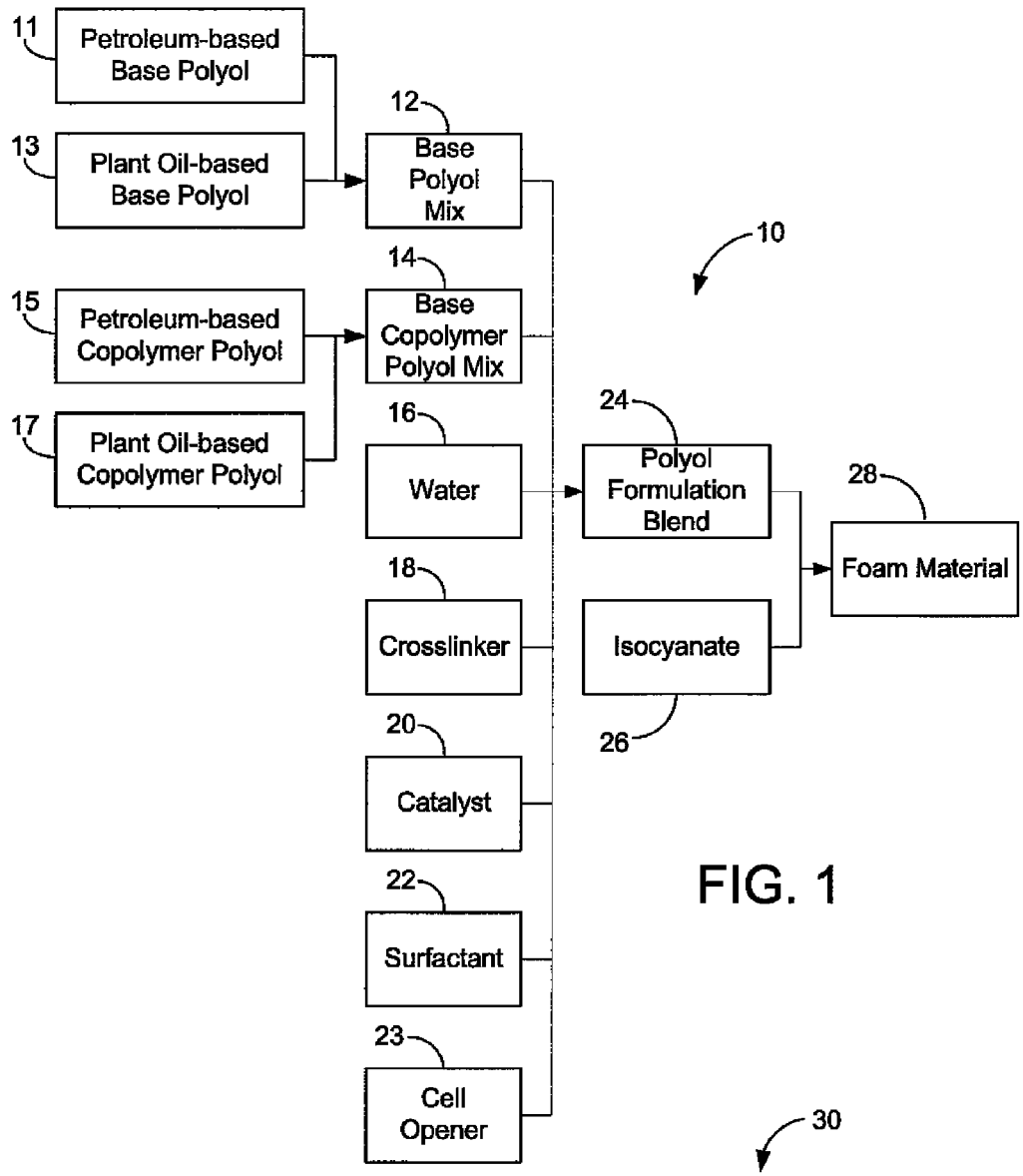
FIG. 1 is a block diagram of a method to forming a foam material according to an exemplary embodiment.

Soft and firm, molded flexible, open-cell, polyurethane foams may be formed from a process of mixing the following components: a base polyol material (such as the Acclaim™ polyol, Multranol™ and Hyperlite™ synthetic resin commercially available from Bayer Materials Science), a copolymer polyol material, water, a crosslinker, a catalyst, a surfactant, a cell opener (or regulator), and an isocyanate reacted according to the process shown in FIG. 1. The base polyol and/or the copolymer polyol materials are preferably made from a relatively higher molecular weight polyol material, and specifically, may be made from a low-monol polyol material.

It is generally understood to mix the above components by pouring two streams of the materials into a mold, closing the mold, and allowing the components to react. Heat may be optionally applied to the mold to help reduce the amount of time to cure the foam and thereby more quickly produce the foam article. After the foam is fully cured (e.g. after about 2 to 60 minutes—depending upon the amount of capital investment and part production time allowed), the foam article is optionally crushed in the mold using a time pressure release process (TPR process). TPR includes reducing the sealing pressure of the mold to allow gas to escape the foam and mold during cure and/or prior being removed from the mold (i.e. "demold"). Then the foam article is optionally mechanically crushed (and may be repeatedly crushed) using a crushing apparatus such as a vacuum, a hard roller, or a brush crusher. The mechanical crushing apparatus applies a predetermined force to obtain a predetermined amount of reduction in thickness at a particular time (e.g. from 15 seconds to 60 minutes, and more preferably from 90 seconds to 2 minutes) after demold and for a given period of crush time. However, such generally known processes result in foam articles not always sufficiently effective at dampening road vibration generated during movement of a vehicle.

The use of natural materials such as plant oil-based polyols is desirable to increase the amount of "green" or readily renewable materials used to manufacture polyurethane foam. Plant oil-based polyols have a relatively low reactivity and molecular weight which has limited their use to percentages to approximately 5 to 7% of the foam by weight when maintaining performance achieved with petroleum based polyols alone.

The present disclosure and inventions identified herein, as currently understood, relate to ethylene oxide (EO) capped base polyol resin-based foam formulations having a monol content of less than about 10% molar concentration that can be produced from a greater variety of base polyol resin materials. The present disclosure and inventions identified herein, as currently understood, also relate to an EO capped base copolymer polyol having a monol content less than about 8% molar concentration. The urethane-based polyol resin blend is preferably made using a water over-packing technique wherein the foam formulation placed in a mold tool in a one shot process includes a greater amount of water than is required for a stoichiometric reaction. This water over-packing technique provides the resulting foam article with greater density than the resulting foam article would have from the stoichiometric reaction.

Further the present disclosure relates to a polyurethane foam made by the process of reacting an EO capped base polyol resin, an EO capped base copolymer polyol resin and an isocyanate. The polyurethane foam made according to the above has an improved attenuating vibration characteristic wherein the foam has a natural frequency of less than about 4.6 hertz and a transmissivity of about 3.6 or less when the thickness of the test block formed from the foam has a thickness of approximately 100 mm. When used to form a vehicle seat cushion, such as that shown in FIG. 17, as described in the present disclosure, the physical properties of the foam depend on the physical dimensions of the seat cushion and the mass supported by the vehicle seat.

The use of plant oil-based materials, and in particular a soybean oil-based polyol material, improves the attenuation of vibration in the polyurethane foam made there from. It has been found that the soybean oil-based polyols impart specific differences in the transmittance of vibration when used with conventional materials to make a foam article. The structure is such that the foam will not vibrate at similar resonance frequencies when the construction is long chain carbon, versus either the PO or EO structures. The percentage of soy-based polyols used is proportional to improved dampening. However, the currently used soybean materials directly decrease the physical properties and process ability of the foam. In particular, a polyurethane foam article is improved at attenuating vibration in a vehicle seat wherein the polyurethane foam article has a natural frequency of about 2.6 to 4.3 hertz and a transmissivity of about 1.01 to 3.5 when manufactured from a plant oil-based polyol material.

Referring to all of the figures and in particular to FIG. 1, a polyurethane foaming system 10 for producing a foam article is shown. According to an exemplary embodiment, at least a portion of the components for the foam making process are derived from a more readily renewable (e.g., "green"), natural source such as from a plant source (e.g., corn, soy, other vegetables and plants, etc.). The foaming system 10 includes the reaction of a base polyol resin blended material 12, a copolymer polyol resin blended material 14, water 16, a crosslinker material 18, a catalyst material 20, a surfactant material 22, a cell opener 23 and an isocyanate material 26. The base polyol material 12 may include both petroleum-based base polyol material 11 and natural oil-based base polyol material 13. The copolymer polyol material 14 may include both petroleum-based copolymer polyol material 15 and natural oil-based base polyol material 17. The base polyol mix 12, the copolymer polyol mix 14, water 16, crosslinker 18, catalyst 20, surfactant 22 and cell opener 23 are blended to make a poly formulation blend 24. The isocyanate 26 and the polyol formulation blend 24 are mixed to form a foam material 28. The water and catalyst may be used to do the blowing of the foam materials, thus affecting the desired foam density. The base for the copolymer polyol 14 may include polymer solids such as styrene acrylonitrile (SAN) in varying proportions of between about 80/20 to about 20/80 and preferably have a blend of about 40/60 styrene to acrylonitrile.

Figure 3:
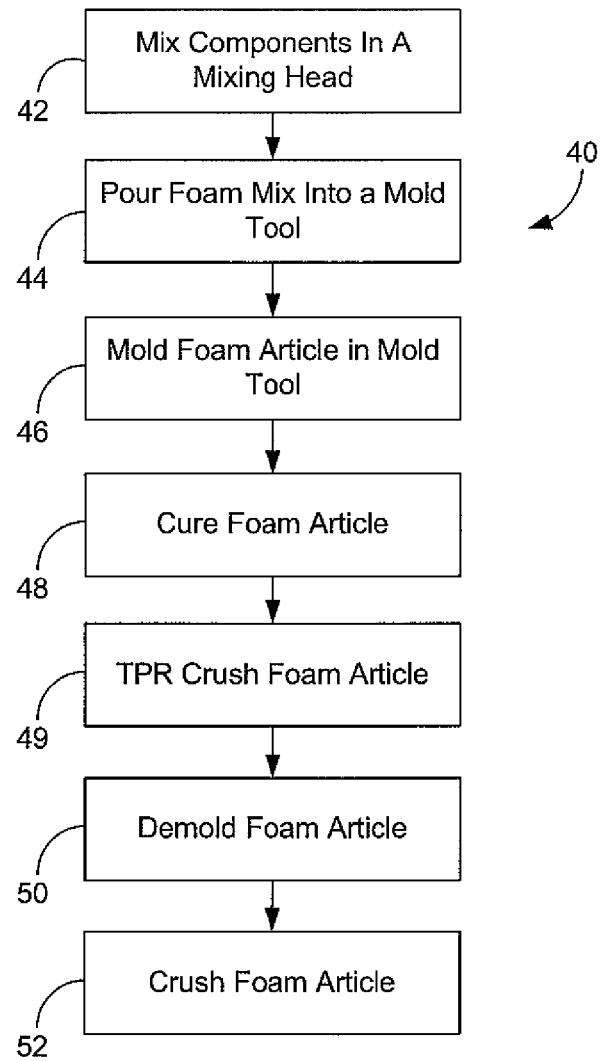
FIG. 3 is a block diagram of a method of molding a component from a foam material including plant oil-based materials according to an exemplary embodiment.

Referring, in particular, to FIG. 3, the foam reaction is performed in a foaming process 40, which may be a "one shot" process according to an exemplary embodiment or may be any other appropriate molding process. A first step 42 of the foaming process 40 includes mixing the components (as shown in FIG. 1) for making the foam material in a mix head. In a second step 44, the foam material is poured into a foam mold tool having a desired shape for producing a foam article such as a seat cushion. In a third step 46, the foam material reacts in the closed mold tool and the foam article is molded in the mold tool. In a fourth step 48, the foam article is allowed to cure or harden. As part of or after the fourth step 48 and while the foam article is still in the mold tool, the foam article may be TPR (time pressure release) crushed to provide improved transmissibility in a TPR crushing step 49.

In a fifth step 50, after the foam article is sufficiently cured, the foam article is demolded from the mold tool. In a sixth step 52, the demolded, foamed article is alternatively, but preferably, crushed a pre-selected amount (% of foam thickness) for a given number of times at a pre-selected time period after demold. Alternatively, as described above, the article may be crushed while still in the mold. The resulting foam article may be in the shape of a block having particular dimensions or may have a particular contoured shape usable for a particular application, such as a seat base cushion, seat back cushion, armrest cushion, or head restraint cushion, according to alternative embodiments.

Figure 2:
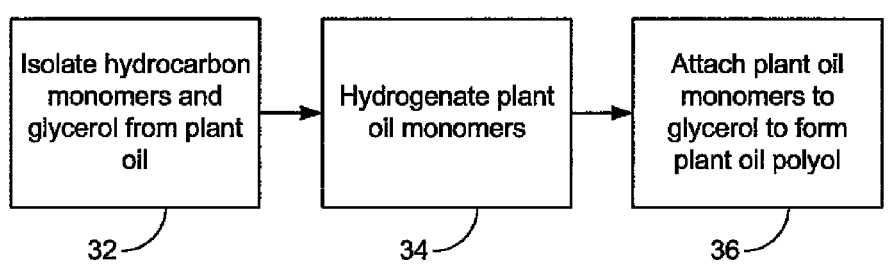
FIG. 2. is a block diagram of a method of manufacturing plant oil-based polyols.

Referring now in particular to FIG. 2, a process for forming natural oil-based polyols 30 is shown according to one exemplary embodiment. A plant or vegetable oil, such as soybean oil, contains triglycerides of various chain lengths. In a first step 32 in the process, hydrocarbon monomers and glycerol are isolated from the soybean oil. In a second and subsequent step 34, the monomers are hydrogenated by/utilizing a metal (zinc preferably) catalyst in the presence of hydrogen provided as a hydroxide. In a third step 36, the hydrogenated monomers are reattached to the glycerin molecule to reform the natural oil polyol material. The reformed natural oil polyol material includes triol, diol and monol molecules and will have an average functionality between approximately 2.5 and 2.8 will generally have a relatively low molecular weight.

While the present disclosure refers in general to soybean oil as the natural (non-petroleum) oil base for the foam material, it should be understood that a wide variety of natural oils from any appropriate plant may be used. For example linseed oil, palm oil, peanut oil, canola oil, castor oil, cotton seed oil, corn oil, or a variety of other natural oils may be used to form polyol molecules and other materials for formulating the polyurethane foam material depending upon a variety of factors including ingredient costs and availability by location.

Referring now to Table 1, an exemplary polyurethane foam formulation showing possible ranges of the amount of each constituent of the foam process (as shown in FIG. 1) is shown. As shown in Table 1, the base polyol and the copolymer polyol compose the majority of the foam. Accordingly, an appreciable increase in foam material from natural renewable sources may be made by using base polyols and copolymer polyols derived from a renewable source.

TABLE 1

Exemplary Foam Composition

| Component | Amount (parts per hundred polyol) |
|---|---|
| Base polyol | 0-100 |
| Copolymer Polyol | 0-100 |
| Water | 0.5-6 |
| Crosslinker | 0.3-4 |
| Catalyst | 0.15-1.8 |
| Surfactant | 0.2-2.5 |
| Cell Opener | 0-4.0 |
| Isocyanate | 12-395 |

Improving the petrochemical-based polyol material portion used in making the foam material allows for an increased amount of natural oil-based polyol material to be used without having physical properties (e.g., durability, vibration dampening, etc.) substantially reduced compared to current conventional foams.

Increasing the percentage of natural oil-based polyol material that is mixed with the petrochemical-based, low-monol polyol material results in a mixture that forms foam with a lower transmissivity comfort number than foam formed exclusively from either. By increasing the amount of low-monol petrochemical polyol used and increasing the soy polyol molecular weight currently in production a 30 to 50% improvement in dampening capability over current foams is possible while maintaining other physical properties at status quote with as much as a 15% soy content by weight.

Figure 4:
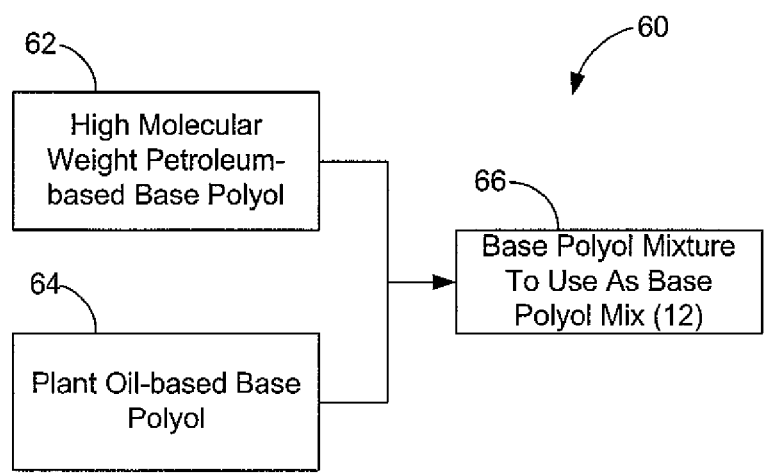
FIG. 4 is a block diagram of a method of forming foam from both plant oil-based and petroleum oil-based materials according to an exemplary embodiment.

Referring to FIG. 4 and according to one exemplary embodiment, a base polyol formulation 60 includes mixing relatively high molecular weight conventional (petroleum based) polyol molecules 62 and existing natural oil polyol material 64. The high-molecular weight molecules 62 are based on low monol concentrations and are sufficiently high in molecular weight that they offset the low molecular weight contribution of the natural oil polyol. The high molecular weight conventional polyol molecules 62 and natural oil polyol material 64 are mixed at a ratio to provide a base polyol mixture 66 with a desired molecular weight for a foam with desired physical properties. The base polyol mixture 66 may be used to form a foam material according to the process shown in FIG. 1. Using material with higher molecular weight creates unique dampening properties not seen in conventional foams with reduced natural frequency and output amplitude to input amplitude ratio (A/Ao; peak transmissibility) compared to currently used foam. Further, increasing the molecular weight generally provides foam with Improved performance characteristics, in particular, increased durability and rebound performance. By increasing the molecular weight of the petroleum-based polyol resin and the resulting foam formulation, better performance characteristics are obtained at a lower mass for a given amount of foam material. Alternatively, also by increasing the molecular weight of the petroleum-based polyol resin and the resulting foam formulation, notably better performance characteristics may be obtained at a similar weight for a given size foam article at about an equivalent to slightly higher cost. The molecular weight of the petroleum-based polyol 62 is preferably greater than about 3000, suitably about 4000 to about 8000, more suitably about 4500 to about 7800, and even more suitably about 6800. Using such a material allows a contribution of a higher percentage of plant oil-based polyol content by weight without changing the structures of current natural oil molecules.

According to one exemplary embodiment the polyol may be a commercially available polyol (oxyalkylene) polymer such as available from Bayer Material Science under the product numbers 3901, 9139, E833, and E960. E833 and E960 may be known by their trademark names, Multranol and Hyperlite™. Referring to Table 2, the hydroxyl numbers and functionalities of several exemplary petroleum-based polyol molecules are shown.

TABLE 2

Hydroxyl numbers and functionalities of several exemplary petroleum-based polyols

| Base Polyol | Hydroxyl No. | Functionality |
|---|---|---|
| 3901 | 28 | 2.7 |
| 9139 | 28 | 2.7 |
| E833 | 31.5 | 2.8 |
| E960 | 25 | 3.0 |

Referring to Table 3, the performance of foam formulated with several high-molecular weight petroleum-based polyol molecules is shown when mixed with various concentrations of soy-based polyol. The values of Table 3 are an extract from the tables shown at FIGS. 5A-5C which is a table showing additional physical properties and characteristics of the exemplary foam formulations of Table 3.

TABLE 3

Transmissibility and vibration properties of various petroleum/soybean oil-based polyol foam material blend.

| Base Polyol | PPH Soy Base Polyol | Natural Frequency (Hz) | Peak Transmissibility | Attenuation Frequency | Transmissibility at 6 Hz | Comfort Number |
|---|---|---|---|---|---|---|
| 3901 | 0 | 3.09 | 7.67 | 4.82 | 0.49 | 23.65 |
| 3901/Agrol1.3 | 5 | 3.21 | 6.45 | 5.03 | 0.59 | 20.66 |
| 3901/Agrol1.3 | 10 | 3.32 | 5.96 | 5.24 | 0.66 | 19.77 |
| 3901/Agrol1.3 | 15 | 3.52 | 5.06 | 5.62 | 0.83 | 17.79 |
| 3901/Soyol 170A | 5 | 3.20 | 6.74 | 5.00 | 0.56 | 21.55 |
| 3901/Soyol 170A | 10 | 3.28 | 6.25 | 5.17 | 0.62 | 20.47 |

TABLE 3-continued

Transmissibility and vibration properties of various petroleum/soybean oil-based polyol foam material blend.

| Base Polyol | PPH Soy Base Polyol | Natural Frequency (Hz) | Peak Transmissibility | Attenuation Frequency | Transmissibility at 6 Hz | Comfort Number |
|---|---|---|---|---|---|---|
| 3901/Soyol 170A | 15 | 3.38 | 4.99 | 5.40 | 0.73 | 16.82 |
| 9139 | 0 | 3.10 | 7.15 | 4.75 | 0.50 | 22.11 |
| 9139/Agrol1.3 | 5 | 3.15 | 6.19 | 4.93 | 0.57 | 19.45 |
| 9139/Agrol1.3 | 10 | 3.19 | 7.25 | 4.85 | 0.54 | 23.13 |
| 9139/Agrol1.3 | 15 | 3.52 | 5.22 | 5.64 | 0.83 | 18.33 |
| 9139/Soyol 170A | 5 | 3.08 | 6.13 | 4.73 | 0.47 | 18.83 |
| 9139/Soyol 170A | 10 | 3.20 | 5.71 | 4.99 | 0.57 | 18.27 |
| 9139/Soyol 170A | 15 | 3.41 | 4.98 | 5.38 | 0.71 | 16.94 |
| E833 | 0 | 3.14 | 7.25 | 4.77 | 0.48 | 22.77 |
| E833/Agrol1.3 | 5 | 3.24 | 6.34 | 5.10 | 0.62 | 20.49 |
| E833/Agrol1.3 | 10 | 3.38 | 5.50 | 5.30 | 0.68 | 18.55 |
| E833/Agrol1.3 | 15 | 3.51 | 5.04 | 5.59 | 0.82 | 17.67 |
| E833/Soyol 170A | 5 | 3.17 | 5.72 | 4.90 | 0.51 | 18.12 |
| E833/Soyol 170A | 10 | 3.25 | 4.97 | 4.99 | 0.54 | 16.13 |
| E833/Soyol 170A | 15 | 3.46 | 3.82 | 5.38 | 0.71 | 13.18 |
| E960 | 0 | 3.07 | 7.45 | 4.69 | 0.46 | 22.83 |
| E960/Agrol1.3 | 5 | 3.08 | 3.88 | 4.81 | 0.54 | 11.94 |
| E960/Agrol1.3 | 10 | 3.21 | 4.52 | 5.00 | 0.57 | 14.49 |
| E960/Agrol1.3 | 15 | 3.42 | 4.69 | 5.51 | 0.78 | 16.02 |
| E960/Soyol 170A | 5 | 3.09 | 4.72 | 4.76 | 0.49 | 14.57 |
| E960/Soyol 170A | 10 | 3.27 | 4.01 | 5.06 | 0.58 | 13.09 |
| E960/Soyol 170A | 15 | 3.50 | 5.22 | 5.57 | 0.80 | 18.23 |

While the foams of FIGS. 5A-5C, 11A-D, and FIG. 15 are shown as being formed with TDI, it should be understood that other isocyanate materials may be used to form the foam material. For example, a similar improvement in performance characteristics such as transmissivity are also seen when foam with increased plant oil materials is formed using methylene diphenyl diisocyanate (MDI; which is commercially available from Bayer Material Science under the trade name MRS-20). Referring in particular now to FIG. 18, there is shown a data table including a control sample (having 100 parts per hundred petroleum-oil based polyol) and a plant oil-based foam blend material having 70 parts per hundred polyol of a petrol oil-based polyol (9139) and 30 parts per hundred polyol of a plant (soybean) oil-based polyol (Agrol 3.6) and showing improved performance specifications. The formulations shown in FIG. 18 are made using MDI (MRS 20) as the isocyanate and demonstrate that the effects of the use of TDI or MDI as the isocyanate on the resulting performance specifications and the transmissibility performance are negligible for a polyol formulation blend including a plant (soybean) oil-based polyol.

As can be seen, the A/Ao (transmissibility) performance specification of the foam is generally reduced as the percentage of the soy-based materials is increased. Further, the transmissivity of the foam material can be improved as the molecular weight of the petroleum-based materials is increased. The foam material will experience a similar enhancement in set properties—both dry and wet set—as well as dynamic durability when the molecular weight of the petroleum-based materials is increased and the percentage of soy-based materials is increased.

"Transmissivity" is the vibration (e.g., road vibration experienced by the wheels of the vehicle) that is transferred by the foam cushion (e.g., to an occupant of the vehicle seat). The transmissivity of the foam products made using the foam material may be obtained using a test scale model number 318.108 commercially available from MTS Corporation of Minneapolis, Minn. Transmissibility, as a measure of transmissivity, is determined as a calculation of "A/Ao" at the given frequency where "Ao" is the input acceleration and "A" is the measured response to the input Ao. Natural frequency is the frequency where the A/Ao ratio is the highest meaning the amplification of Ao is the greatest.

The Seat Effective Amplitude Transmissibility value ("SEAT" value) is a determined characteristic which represents the relationship of the transmissivity in a vehicle application. This value is determined by the comparison of the VDVo (Vibration Dose Value) from the occupant, divided by the VDVr from the road input to the seat multiplied by 100 and is described in the book by Michael Griffin, *Handbook of Human Vibration* (1st ed. 1990) at page 404-413. For example if the road input vibration is 1.00 (VDVr) and the seat occupant vibration is 0.8 (VDVo), then the S.E.A.T. is 80%. Suitable vibration absorbent foam allows for a reduction of the SEAT value by at least as much as 20%. Therefore a representative test for providing a performance characteristic of the foam for use in a vehicle seat system, the SEAT value is considered a good measure of the seat system performance. Included in the SEAT value is the percentage contribution from the foam.

One goal for the foam formulation and process used to make the foam article is to obtain the best SEAT value for a given height and density of foam article. It has been determined that better SEAT values result when the transmissibility (A/Ao) value is relatively low and the natural frequency of the foam is low which is obtained by formulating foam having a relatively higher molecular weight. In one exemplary embodiment, one further measure of the potential real performance of a foam product in a vehicle seat application is to multiply the natural frequency times the peak measured transmissivity (A/Ao) to provide a "comfort value". It has been determined that a suitable range for such a comfort value is between about 6.5 to 18.5, more suitably between about 8.5 and 13.5 and most suitably between about 10.5 and 12.5. A comfort value below 12.7 for automotive seating generally gives an acceptable SEAT performance on any road profile which is most desirable.

Referring to FIGS. 6A-6C, a table is shown including the Seat Effective Amplitude Transmissibility value for a multitude of exemplary vehicles as described in the report by G. S.

Paddan et al, "Use of seating to control exposures to whole-body vibration" (2001). The SEAT values of the vehicles were determined using a variety of road conditions (e.g., a tarmac, mud, grass, concrete, etc.), a multitude of speeds, and a weighting Wk as defined in International Standard ISO 2631 (1997).

The SEAT value of the seats in the vehicles of FIGS. 6A-6C when using a seat cushion, similar to that shown in FIG. 17, formed from a foam with high molecular weight polyol and/or soy-based polyol was determined with the transfer functions shown below and assume a constant density, hardness, thickness, cure time, and expansion for the foam formulations. The transfer functions relate to a seat bottom cushion and assumes the presence of a conventional seat back cushion. Equation 1 is a transfer function that converts the SEAT value of a seat bottom cushion made from a traditional foam to the SEAT value of a similar cushion formed from a high molecular weight foam such as one including E960 base polyol. A is the original SEAT value; V is a factor that is determined by the road conditions, the speed of the vehicle and the type of seat suspension conditions; and y is the newly estimated SEAT value. For a vehicle with a foam seat and a suspension, moving at 4-80 km/hr on a smooth surface, V is equal to 3. For a vehicle with a full foam seat, moving at 4-113 km/hr on a smooth surface, V is equal to 5. For a vehicle with a full foam seat, moving at 20-113 km/hr on a rough and/or smooth surface, V is equal to 10.

$$y = A - V \quad \text{Equation 1}$$

Equation 2 is a transfer function that converts the SEAT value of a seat bottom cushion made formed from petroleum-based materials to the SEAT value of a similar cushion formed at least partially from soy-based materials. B is the original SEAT value (e.g., a traditional foam seat of a high molecular weight foam seat), x is the % soy content added and z is the newly estimated SEAT value from the transfer function.

$$z = B - ((0.4)*x)*B \quad \text{Equation 2}$$

As can be seen, the SEAT value of the vehicle seat generally reduced as the percentage of the soy-based materials is increased. Further, it is evident that the SEAT value of the vehicle seat is decreased as the molecular weight of the petroleum-based materials is increased. The SEAT value of the vehicle seat is decreased further when the vehicle seat is formed from a foam including both a higher molecular weight petroleum-based material and an increased amount of soy-based material.

Another way to facilitate the addition of more renewable, such as soy content, into a foam without decreased performance is to increase the molecular weight and length of the plant oil-based polyol chain.

Figure 7A:
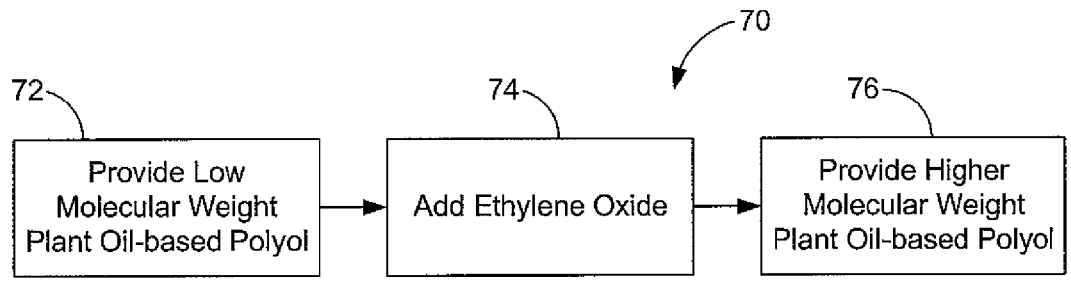
FIGS. 7A-7C are block diagrams of methods of forming a higher molecular weight plant oil-based polyol molecule by EO and PO capping according to an exemplary embodiment.

Referring now to FIG. 7A, a method 70 of increasing the length of a natural oil-based polyol molecule is shown according to an exemplary embodiment. A natural oil-based polyol with a relatively low molecular weight is provided in a step 72. Ethylene oxide (EO) is added in a step 74. The EO is reacted with the polyol to "cap" the polyol, which increases the length, weight and reactivity of the soy-based polyol molecule. The increase in reactivity decreases the amount of catalyst needed to produce foam using the polyol. The EO-capped soy-based base polyol provides a polyol with an increased molecular weight 76 for a poly formulation mix.

Figure 7B:
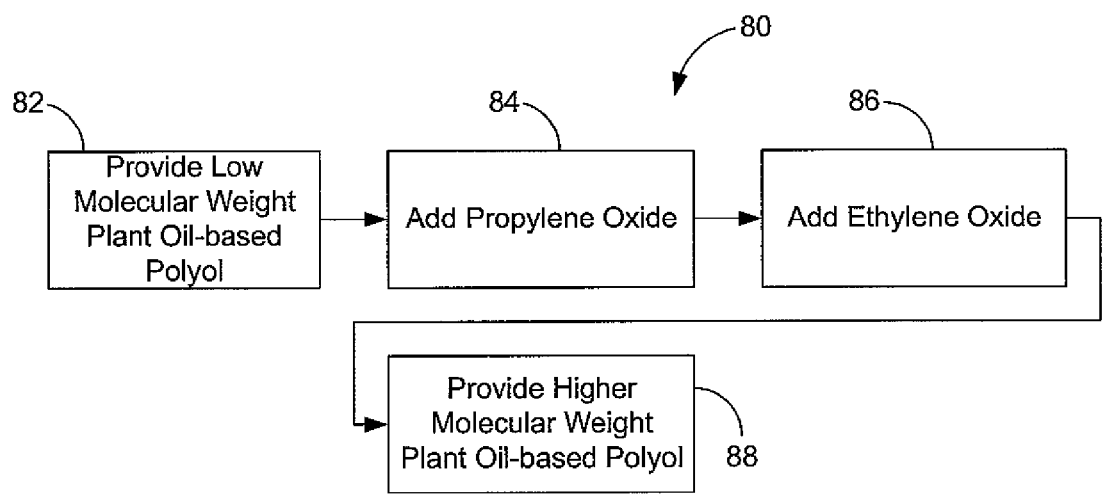

Referring now to FIG. 7B, a method 80 of increasing the length of a natural oil-based polyol molecule is shown according to another exemplary embodiment. A natural oil-based polyol with a relatively low molecular weight is provided in a step 82. Propylene oxide (PO) is added in a step 84. The PO is reacted with the polyol to "cap" the polyol, which increases the length, and weight of the soy-based polyol molecule. Ethylene oxide (EO) is added in a step 86. The EO is reacted with the polyol to "cap" the polyol, which further increases the length, weight and reactivity of the soy-based polyol molecule. The increase in reactivity decreases the amount of catalyst needed to produce a foam using the polyol. The EO-capped soy-based base polyol provides a polyol with an increased molecular weight 88 for a poly formulation mix.

Figure 7C:
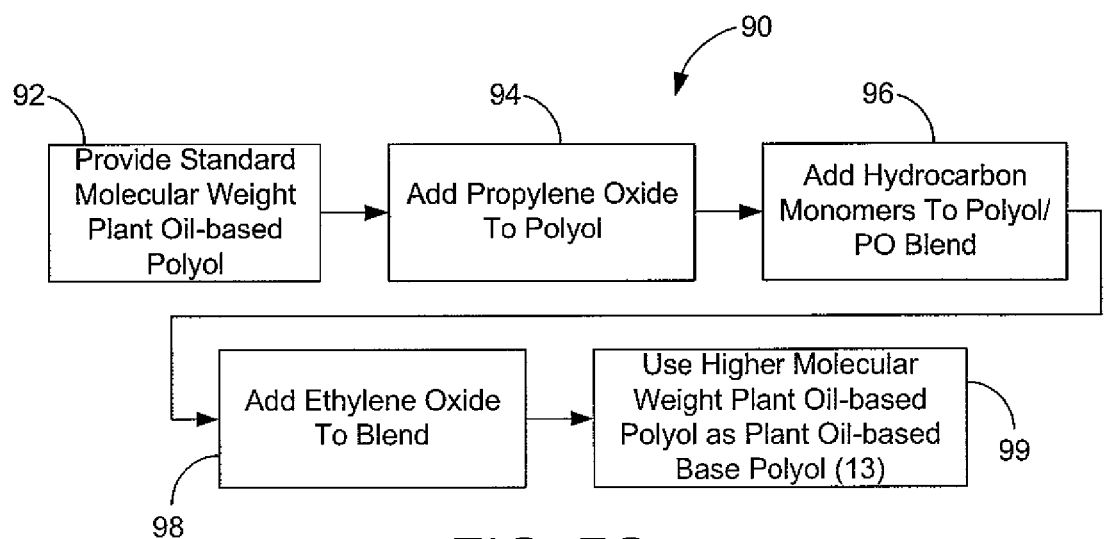

Referring now to FIG. 7C, a method 90 of increasing the length of a natural oil-based polyol molecule is shown according to another exemplary embodiment. A natural oil-based polyol with a relatively low molecular weight is provided in a step 92. Propylene oxide (PO) is added in a step 94. The PO is reacted with the polyol to "cap" the polyol, which increases the length, and weight of the soy-based polyol molecule. Additional monomers from a natural oil are added to the molecule in a step 96 to further increases the length and weight of the soy-based polyol molecule. Ethylene oxide (EO) is added in a step 98. The EO is reacted with the polyol to "cap" the polyol, which even further increases the length, weight and reactivity of the soy-based polyol molecule. The increase in reactivity decreases the amount of catalyst needed to produce foam using the polyol. The EO-capped soy-based base polyol provides a polyol with an increased molecular weight 99 for a poly formulation mix.

According to one exemplary embodiment, the EO and PO may be conventional materials derived from petroleum. According to another exemplary embodiment, the EO and PO may be derived from a natural oil source such as corn or another renewable source. For example, ethylene oxide may be formed using ethanol derived from corn starch. The ethanol is dehydrated with a strong acid desiccant such as sulfuric acid to form ethylene. The ethylene is reacted with oxygen on a silver catalyst to form ethylene oxide. Propylene oxide may be formed using propanol from corn starch. According to other exemplary embodiments, ethylene glycol and propylene glycol may be used to form the EO and PO.

According to still other exemplary embodiments, the ethylene oxide and propylene oxide used to form the polyol for use in the foam material may be derived from a combination of petroleum and natural oils. For example, the ethylene oxide material may contain between 10 and 30% natural oil-based material and the propylene oxide contains between 20 and 90% natural oil-based material. Foams derived from these EO and PO capped polyol materials have molecular weights approaching those of typical petroleum oil-based materials— which range from 4800 to 6800 in molecular weight.

Referring still to FIGS. 7A-7C, increasing the molecular weight and functionality of the soy-based base polyol may allow the amount of soy-based material in the foam to be between 30 and 63 parts per hundred (pph). According to an exemplary embodiment the soy material base polyol in the foam may be between 30 and 50 pph. According to a particularly preferred embodiment, the soy material base polyol in the foam may be between 30 and 40 pph. The amount of water may be between 0.5 and 5.5 pph. According to an exemplary embodiment, the amount of water may be between 1.5 and 3.0 pph. According to a particularly preferred embodiment, the amount of water may be between 1.5 and 2.5 pph. The amount of catalyst may be between 0.15 and 0.60 pph. According to an exemplary embodiment, the amount of catalyst may be between 0.15 and 0.30 pph. According to a particularly preferred embodiment, the amount of catalyst may be between 0.15 and 0.25 pph.

Figure 8:
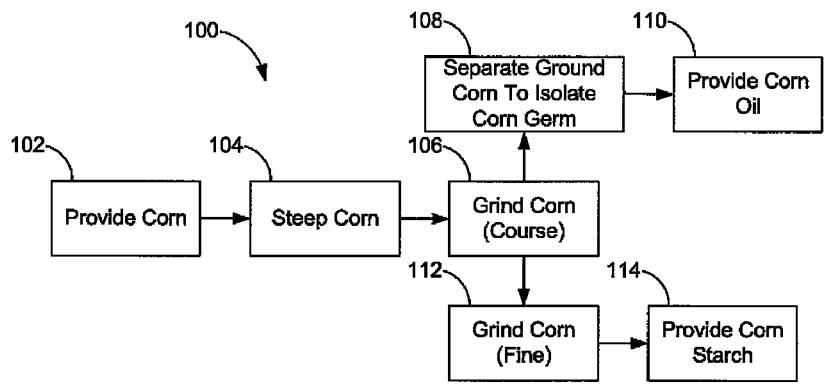
FIG. 8 is a block diagram of a method of processing corn to form materials for a foam material according to an exemplary embodiment.

According to another exemplary embodiment, other alcohols may be used to form a base polyol material derived from a natural material such as corn. Referring to FIG. 8, flowchart of a corn milling process 100 is shown according to an exemplary embodiment. Corn grain 102 is provided as a base that may be processed to derive a variety of products. The corn grain is steeped 104 in an aqueous solution to extract soluble substances from the corn kernels. The corn is then ground 106. The ground corn may be separated to isolate the corn germ 108. The corn germ is then processed to provide a corn oil 110. The corn oil 110 may be used as a source for acid monomers similar to the process described above for soy oil. The slurry of ground corn may be ground further 112 to derive other products. For example, the ground corn may be separated 114 to remove the fiber and protein from the corn starch 114.

Figure 9:
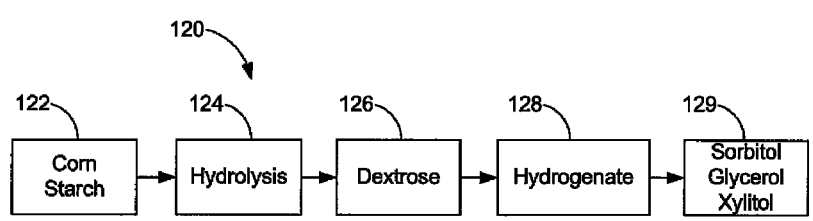
FIG. 9 is a block diagram of a process for forming alcohols for the formation of a polyol molecule from a corn starch material according to an exemplary embodiment.

The corn starch 114 may be used to form a copolymer polyol, as described in more detail below. The corn starch 114 may also be used to derive other useful materials such as alcohols. FIG. 9 is a block diagram of a process for forming an alcohol 120. In a step 122, corn starch, such as from the process described above, is provided. In a step 124, a hydrolysis reaction is performed to break down the molecule. The hydrolysis reaction provides simple sugars, such as dextrose in a step 126. In a step 128, a hydrogenation reaction is performed to provide alcohols 129 such as sorbitol, glycerol, and/or xylitol. The alcohol 129 may be used to form a polyol such as described above in several embodiments. Sorbitol alone forms a polyol that includes molecules with functionalities of 2, 4, and 6 and with some average functionality, between approximately 2.5 and 2.9 and more preferably between 2.7 and 2.9. Xylitol forms a polyol that includes molecules with functionalities of 2, 4, and 6 and with some average functionality, between approximately 2.7 and 2.9. Using a higher functional alcohol such as sorbitol provides a higher functional polyol with better set properties and better tear strength. According to an exemplary embodiment, the polyol has a viscosity between 6,000 and 10,000 centipoises (cps). According to an exemplary embodiment, this polyol material, when blended with glycerin product, provides a base polyol with an average functionality of 2.2 to 3.2. According to a particularly preferred embodiment, the polyol material has a functionality of approximately 2.7 to 2.9 for purposes of manufacturability and having performance specifications required for a seat application such as in a vehicle.

This polyol may be mixed with a second polyol with lower durability, such as one described above, to create a polyol blend with the similar weight as the second polyol and higher durability or a polyol blend with a similar durability as the second polyol and a lower weight.

Figure 10:
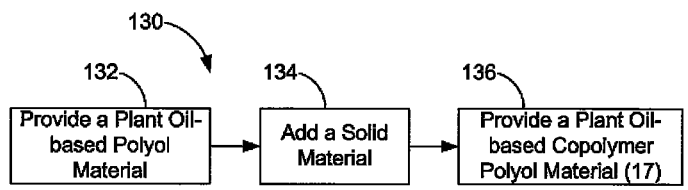
FIG. 10 is a block diagram of a process for forming a copolymer polyol including plant oil-based materials according to an exemplary embodiment.

A similar process to that described above may be used to create a copolymer polyol that is made at least partially from natural, renewable sources. Because the copolymer is potentially a large component of the foam by weight, as shown in Table 1, it is desirable to have it include renewable source material as a hardener. Referring to FIG. 10 a process for manufacturing a copolymer polyol 130 is shown according to an exemplary embodiment. In a first step 132, a polyol such as described above is provided. In a second step 134, a solid material is mixed with the polyol. According to an exemplary embodiment, the solid material may be corn starch, urea, styrene, acrylonitrile, or any other suitable material for making the foam material more firm to provide higher load bearing capability for the foam article. The solid material is suspended in or grafted to the polyol depending on the time and temperature of the reaction. The solid material generally adds strength to the polyol. In a step 136, a natural oil-based copolymer polyol is provided for a polyol formulation blend as shown in FIG. 1.

According to one exemplary embodiment, the copolymer polyol is generated with the addition to the soy-based base polyol of urea, starch (e.g., corn starch) or urea and corn starch mixed in a percentage. According to one particular embodiment, a foam is formed with approximately 10 pph starch-based copolymer and 75 pph urea-based copolymer. Formulations and properties of several foam materials are shown in FIGS. 11A-11D including copolymer polyols formed with starch (FIGS. 11A-11B) and urea (FIG. 11C-11D).

According to another exemplary embodiment, the copolymer polyol is generated with the addition to the soy-based base polyol of styrene, acrylonitrile or styrene and acrylonitrile mixed in a percentage. Adding 100% styrene provides a copolymer polyol that forms relatively soft foam with a relatively low flammability. Foam formed with a 100% styrene copolymer polyol is an open cell foam that requires minimum crushing. Adding 100% acrylonitrile provides a copolymer polyol that forms relatively firmer foam with a relatively high flammability and requires a high amount of crushing. A mixture of styrene and acrylonitrile (SAN) may be used to create a copolymer polyol with a varied particle size (e.g., 40% styrene and 60% acrylonitrile, 50% styrene and 50% acrylonitrile, 60% styrene and 40% acrylonitrile, etc.). The exact percentage of styrene and acrylonitrile added to create the copolymer polyol may be varied to create a foam with the desired characteristics.

It should be understood that any process disclosed in this application for the production of a natural oil-based base polyol may also be used to create a copolymer polyol as described above or with another process known in the art.

Soy or other natural renewable sources may also be used as a diluent base for other components used to manufacture foam, including catalysts, cross linkers, and surfactants. Such components are often used to increase the ease of blending and to reduce the cost of the foam. Currently, urethane additives such as catalysts and surfactants are diluted with polyols, glycols and alcohols which are generated from petroleum based materials. Deriving these materials from soy oil-based based diol as opposed to the conventional alcohols or polyols further increases the percentage of the foam created from natural renewable sources.

According to one exemplary embodiment a diluent is formed using soy-based materials. Soy-based diluents can be significantly less expensive than traditional diluents such as dipropylene glycol. Soy oil monomers and glycerin are isolated using existing methods. The lower molecular weight material is made into isomers, hydrogenated, and EO-capped with ethylene oxide to make the molecule more reactive as described earlier. The soy-based diol is used as a diluent for the manufacture of silicone surfactants. The chain length of the monomers may be adjusted as needed to increase solubility.

Figure 12:
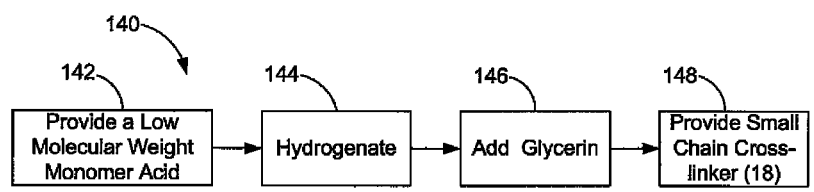
FIG. 12 is a block diagram of a process for forming a small-chain cross-linker for a foam product according to an exemplary embodiment.

Referring to FIG. 12 and according to another exemplary embodiment, a process for forming a cross-linker from a soy-based material 140 is shown. In a step 142, a low molecular weight diol is provided such as from soy or another natural oil. In a step 144, the diol is hydrogenated. In a step 146, the material is expanded to include glycerin derived from natural oil and the diol is combined with the glycerin. In a step 148, the equivalent of a small chained triol is provided which acts as cross-linking agent. This adds firmness and reduces copolymer polyol usage while increasing the natural or renewable resource content of the foam.

Figure 13:
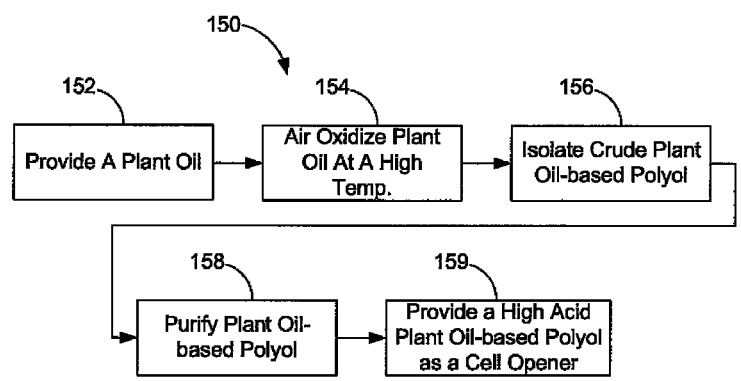
FIG. 13 is a block diagram of a method of forming an acid-based polyester polyol cell opener for a foam material according to an exemplary embodiment.

According to another exemplary embodiment, and FIG. 13, a process 150 for forming a cell-opener is from a soybean oil-based material is shown. A plant oil 152 such as soybean oil is air oxidized at a high temperature 154 (e.g., by steaming). Polyester polyol molecules 156 including natural trace acids (below 16%). The polyol molecules are purified 158 and used to provide a cell opener for a foam material 159. Such high acid polyester polyols are generally undesirable and discarded because they form poor base polyol molecules for a foam formulation. However, the nature of the high acid polyester polyol molecules makes them desirable as a cell opener for a foam formulation.

According to one exemplary embodiment, a foam formulation includes a high-acid polyester polyol material (polyester polyol having trace acids between 0.5 and 4.0% of the polyol) as a cell-opener. When the components are combined to form the poly formulation blend, the acid in the cell opener reacts with the catalyst to form a salt. The cell opener is configured to open the cells of the foam by holding the catalyst until an elevated temperature is reached. Because the catalyst is held and the reaction is delayed, soft segments form first during the curing of the foam. When the elevated temperature is reached (e.g., as the heat of reaction increases), the catalyst is released causing the foam cells to open later and the foam to form urea or hard segments later. This allows for better durability, wet set properties, and dynamic ride properties. The soy molecule offers the unique characteristic of long chain carbon (C—C) bonds that are not typical in traditionally available materials. According to current methods, extra density is often added to meet wet sets. A chemical additive may be used to reduce wet set and reduce the weight of the foam. The acid content of the cell-opener determines the size of the cells in the finished foam product. A cell opener may be used in a rapid curing process. For example, a cell opener may be used when the foam article is not able to be crushed for cost reasons. A cell opener may also be used when crushing the foam article would cause appearance issues such as with a foam poured or injected behind a flexible cover stock. A cell opener may also be used when the foam article can not be crushed because the foam material is poured or injected behind or inside a rigid frame.

Figure 14A:
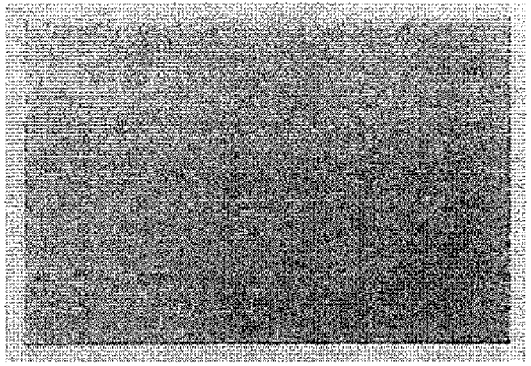
FIGS. 14A-14E are cross sections of a foam material formed with various concentrations of soy-based cell-opener.
Figure 14B:
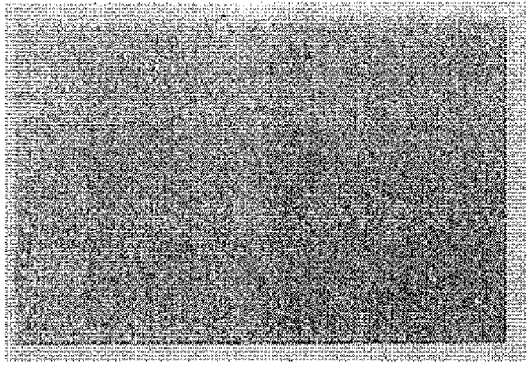
Figure 14C:
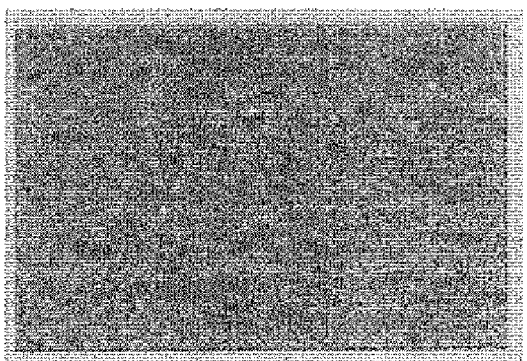
Figure 14D:
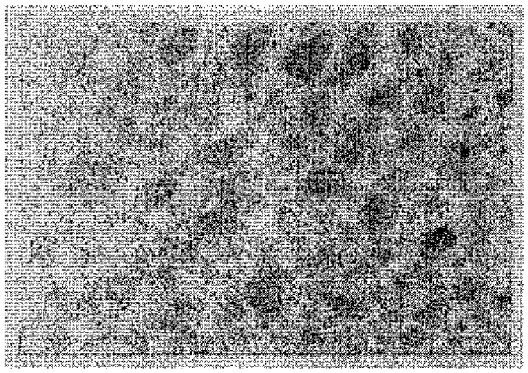
Figure 14E:
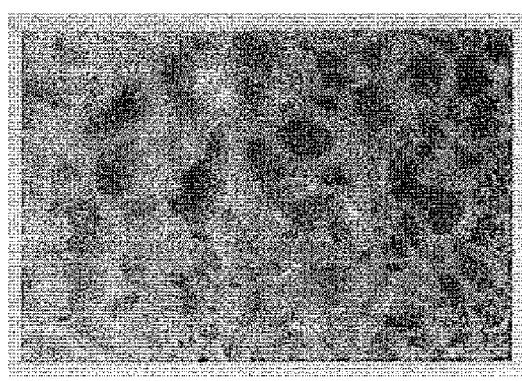

Several exemplary foam materials are shown in FIGS. 14A-14E. FIG. 14A illustrates a foam material with no cell opener. FIG. 14B illustrates a foam material with 3 pph of a polyester-based, natural oil polyol with high acid content that is added to the base polyol to function as a cell opener in the foam material for when it is reacted with the isocyanate, such as TDI. The polyester-based, plant oil polyol may more preferably be used with MDI as the isocyanate. Such a polyester-based soy oil polyol is available under the trade name Soyol 170 G, from United States Soy Company. FIG. 14C illustrates a foam material with 5 pph polyester-based soy oil polyol as a cell opener. FIG. 14D illustrates a foam material with 10 pph polyester-based soy oil polyol as a cell opener. FIG. 14E illustrates a foam material with 20 pph polyester-based soy oil polyol as a cell opener.

As the acid value of the Soyol 170 G contained in the cell opener increases, the size of the cells in the finished foam product increases, as visual inspections confirms. With no cell openers the foam may shrink upon curing. Excessive cell opener included in the foam formulation may cause the foam cells to be too open and the foam to be too soft. According to an exemplary embodiment, the size of the cells is kept relatively small and the foam formulation includes 0.1-3 pph of the polyester polyol. The acid value of the cell opener is 0.5-4.0. If the cell opener has a relatively high acid value (e.g., 4.0), then less cell opener is needed in the foam formulation (e.g., approximately 0.1 pph). If the cell opener has a relatively low acid value (1.0), more cell opener may be used in the foam formulation (e.g., 3.0 pph). Referring to FIG. 15, a table is shown including several physical properties and characteristics of foams formulated with various concentrations of a soy-based cell-opener which was obtained by preparing the polyol according to the process shown in FIG. 13.

According to another exemplary embodiment, soy products with two polyol types or chain lengths are used in a foam manufacturing process. A first group of short chain soy diols can be used with MDI to replace copolymer polyol to build load, and increase cross linked density. The diols have a functionality between 1.5 to 1.9 and a hydroxyl number between 110 to 85. This first group of soybean oil-based products replace copolymer polyol for firmness replacement in the polymer matrix and remove inert filler of styrene and acrylonitrile. A second group of longer chain soy diols can be used to improve some of the flexibility to improve the performance with regard to set properties. The second group of diols have a functionality between 1.5 to 1.9 and a hydroxyl number between 38 and 32. The second group of soy products also increase chain length to increase flexibility to allow for the foam to be somewhat more resilient. The addition of the two groups of soy products would further increase the percentage of the foam that comes from natural renewable resources and maintain or improve performance relative to currently used foams.

In addition to increasing the percentage of the foam components from natural more readily renewable sources, the unsaturation (presence of double bonds) of the soy-based molecules and the methods used to manufacture them result in a foam article, with more desirable properties. The molecules do not have the properties that allow for vibration attenuation which leads to occupant fatigue. The use of soy oil-based molecules in the polyol to form the foam material leads to a potential for a lower cost, better vibration dampening product that assists some of the high-cost, highly engineered molecules of the petrol oil-based polyols. A functionality of 2.3 to 2.7 with corresponding hydroxyl numbers of 110-95 and 85-78 would allow for some potential dampening of the foam at natural frequency and through the frequency range of 6 to 60 hertz.

Figure 16A:
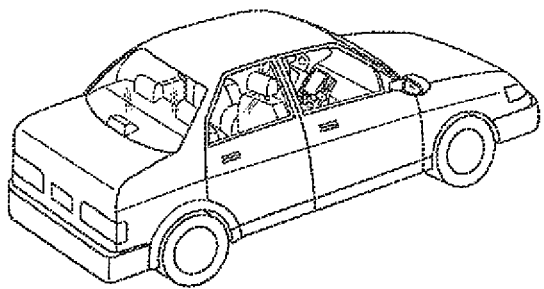
FIGS. 16A-16N are views of a vehicle according to various exemplary embodiments including seating or other structures incorporating foam manufactured at least partially with plant oil-based materials.
Figure 16B:
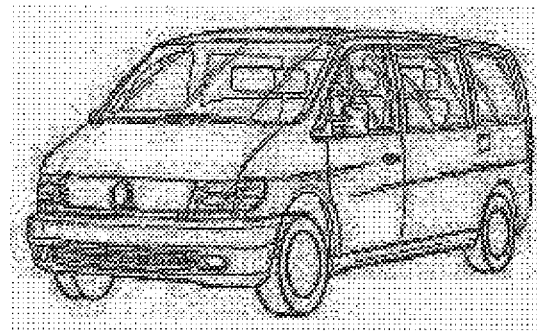
Figure 16C:
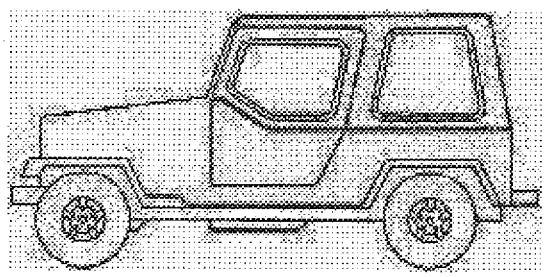
Figure 16D:
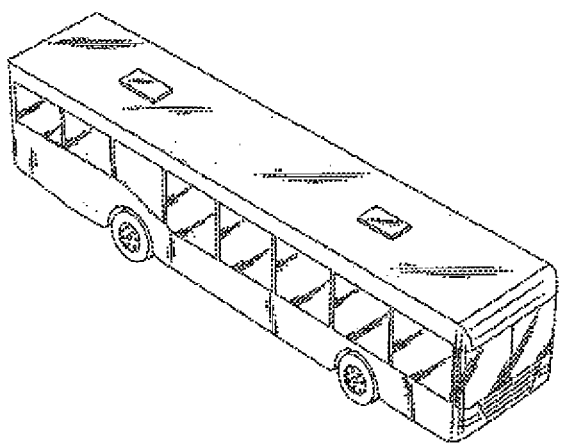
Figure 16E:
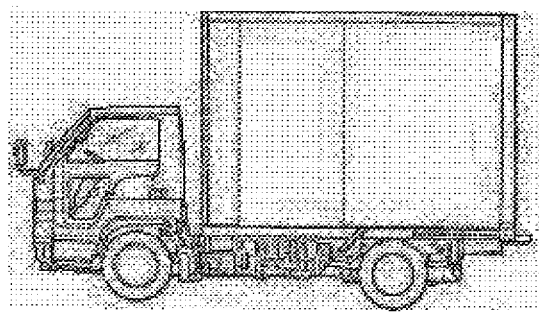
Figure 16F:
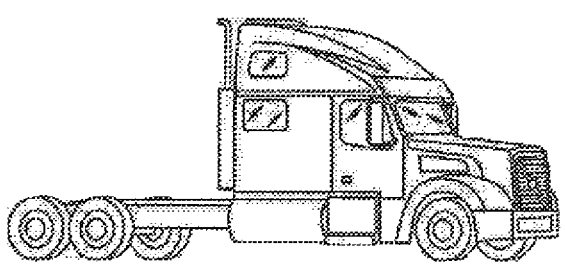
Figure 16G:
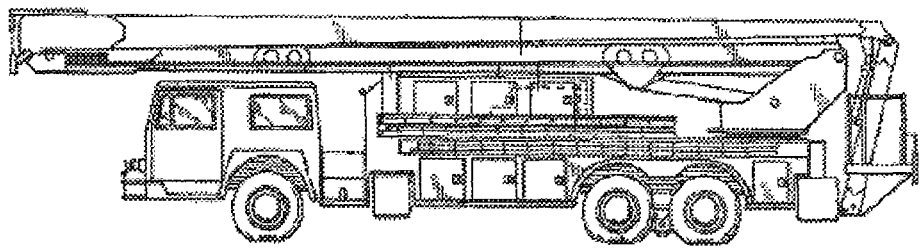
Figure 16H:
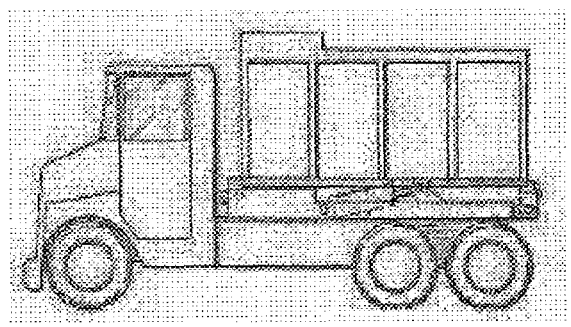
Figure 16I:
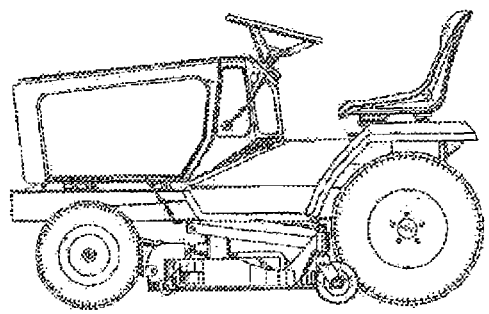
Figure 16J:
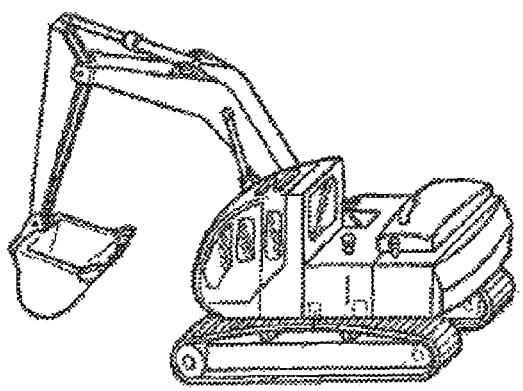
Figure 16K:
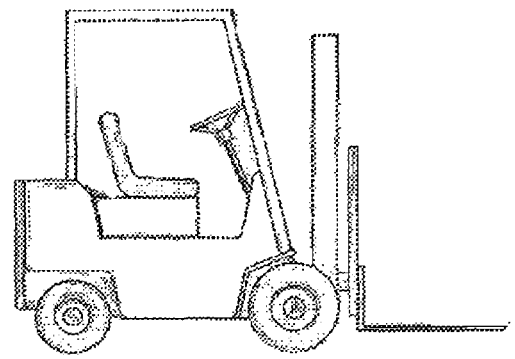
Figure 16L:
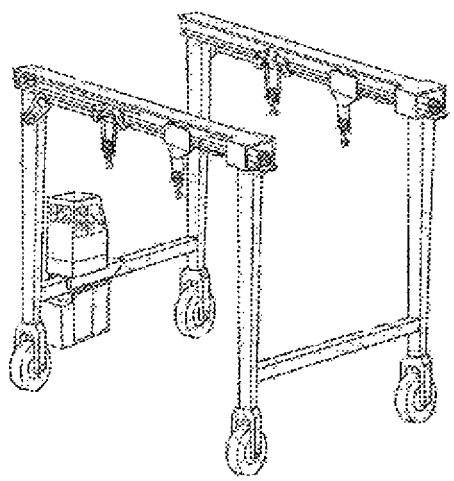
Figure 16M:
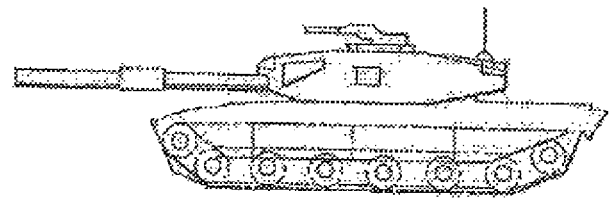
Figure 16N:
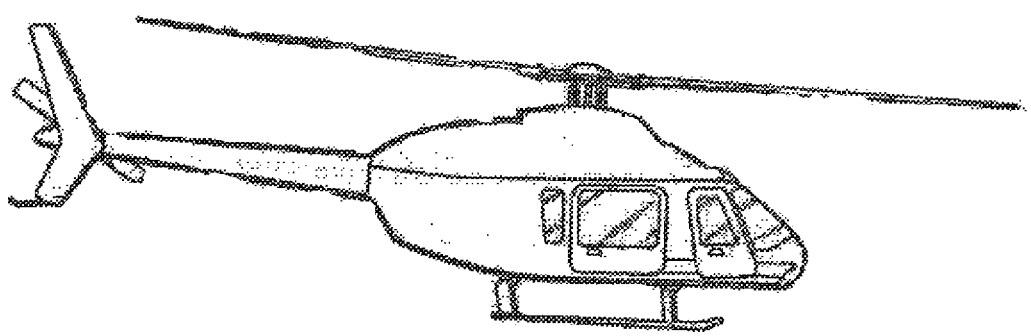

Foam with increased plant oil-based polyol content as described in this disclosure may be used for many automotive applications including molded foams for seating. Seating formed from the foam described above may be used for a variety of vehicles, including but not limited to passenger vehicles (e.g., cars or automobiles (FIG. 16A), vans (FIG. 16B), sport or cross-over utility vehicles (FIG. 16C), light trucks, busses (FIG. 16D), etc.), medium trucks such as box trucks (FIG. 16E), heavy trucks (e.g., semi-trailer trucks (FIG. 16F), fire engines (FIG. 16G), dump trucks (FIG. 16H), etc); landscaping vehicles (e.g., mowers (FIG. 16I), excavators (FIG. 16J), etc.), industrial vehicles (e.g., lift trucks (FIG. 16K), etc.), armored vehicles (FIG. 16M), and aircraft such as helicopters (FIG. 16N) and any and all other seating applications.

Figure 17:
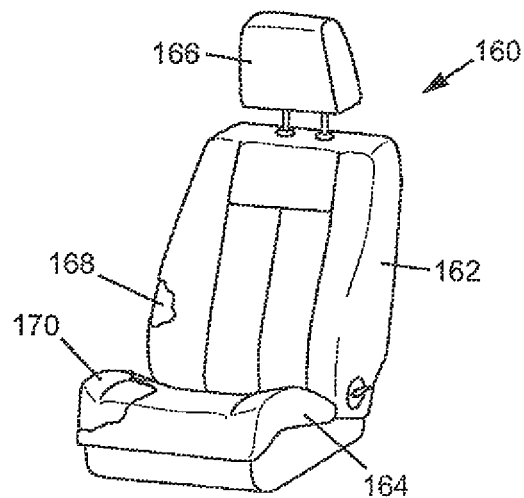
FIG. 17 is a perspective view of a vehicle seat and its components incorporating a foam material having a plant oil-based polyol foam.

Referring to FIG. 17 in particular, the plant oil-based polyol foam formulations may be used in a numerous components of the vehicle seat 160 including the seat bolster cushion 162, the seat cover 164, the head restraint 166, the seat back cushion 168 and the seat base cushion 170. Further, the plant oil-based polyol foam formulations may also be used in pour-in-place manufactured components. In particular, it should be noted that the increase in transmissivity performance and in vibration dampening characteristics will allow for a thinner cushion with equivalent performance as well as seat construction with a higher percentage of materials from renewable resources. The plant oil-based polyol foam formulations may also be used in elastomers, and items such as shoe soles and plastic replacements. And the plant oil-based polyol foam formulations may further be used in any and all other articles that can be made from such material.

According to other various exemplary embodiments, the plant oil-based polyol foam formulations disclosed herein may be used for other automotive interior components, as shown in FIG. 19, including a headliner 180, a door panel 182, an instrument panel 184, a steering wheel 186 and carpeting 188.

The construction and arrangement of the elements of the processes for forming polyurethane foam shown in the various exemplary embodiments disclosed, including the best embodiment, are illustrative only. Only a few embodiments of the present disclosure are described in detail herein. Those of ordinary skill in the art who review this disclosure will readily appreciate that modifications are possible without departing from the novel teachings and advantages of the disclosure as limited only by the following claims.

What is claimed is:

1. An open cell, polyurethane foam material comprising the reaction product of:
   a base polyol including a petroleum-based polyol and a plant oil-based polyol, wherein the plant oil-based polyol is present in the base polyol in an amount between 5 and 30 parts per hundred polyol, wherein the base polyol has a functionality of 2.3 to 2.9;
   an isocyanate;
   water;
   a surfactant; and
   a crosslinker, wherein greater than 5 percent of the content of the foam material is from non-petroleum based content, wherein the foam material is molded for use as a vehicle seat cushion and has a natural frequency of less than about 4.6 hertz and a transmissivity of about 3.6 or less when the foam material has a thickness of approximately 100 mm, and wherein the foam material has a comfort number less than 12.7 as determined by the product of the natural frequency and a peak transmissibility of the foam material.

2. An open cell, polyurethane foam material comprising the reaction product of:
   a base polyol including a first petroleum-based polyol and a first plant oil-based polyol, wherein the first plant oil-based polyol is present in the base polyol in an amount between 5 and 30 parts per hundred polyol, wherein the base polyol has a functionality of 2.3 to 2.9 and propylene oxide and sucrose are added to the base polyol and blended with a glycerin material to produce a co-initiated polyol having a functionality of between approximately 2.8 and 3.2;
   a copolymer polyol including a second petroleum-based polyol, a second plant oil-based polyol, and at least one of styrene and acrylonitrile;
   an isocyanate;
   water;
   a surfactant;
   a catalyst;
   a cell opener; and
   a crosslinker, wherein the foam material has a natural frequency of about 2.6 to 4.3 hertz and a transmissivity of about 1.01 to 3.5 when the foam material has a thickness of approximately 100 mm.

3. An open cell, molded foam article made from an open cell, foam material, for use in a seat application, produced from the reaction product of a polyol formulation blend and an isocyanate, wherein the polyol formulation blend comprises:
   a base polyol including a first plant oil-based polyol material and a first petroleum-based polyol material, wherein a propylene oxide or an ethylene oxide, or a combination thereof, is added to the base polyol to increase its molecular weight;
   a copolymer polyol having between 5 and 15 parts per hundred of a second plant oil-based polyol material and a second petroleum-based polyol material, wherein propylene oxide and sorbitol, blended with glycerin, are added to the copolymer polyol to produce a co-initiated polyol having a functionality of between 2.3 and 2.9;
   water;
   a crosslinker;
   a cell opener;
   a catalyst; and
   a surfactant, wherein greater than five percent of the content of the foam material is from non-petroleum based content and
   wherein the foam article is a base cushion for supporting an occupant of a vehicle seat for a use in an automobile and the vehicle seat has a comfort number less than 12.7 as determined by the product of a natural frequency and a peak transmissibility of the foam article.

4. An open cell foam article made from an open cell foam material comprising:
   a polyol formulation blend;
   an isocyanate;
   a blowing agent;
   a crosslinker; and
   a surfactant, wherein the polyol formulation blend comprises a base polyol and a copolymer polyol having between five and fifteen parts per hundred of a plant oil-based polyol material; wherein the copolymer polyol is generated by adding at least one of styrene and acrylonitrile to the base polyol such that the foam article has a comfort number less than 12.7 as determined by the product of a natural frequency and a peak transmissibility of the foam article.

5. The open cell foam article of claim 4 wherein a styrene and acrylonitrile mixture is added to the base polyol to generate the copolymer polyol and the ratio of the mixture is between 40% styrene and 60% acrylonitrile and 60% styrene and 40% acrylonitrile.

6. The open cell, polyurethane foam material of claim 1, wherein the foam material has the natural frequency of about 2.6 to 4.3 hertz and the transmissivity of about 1.01 to 3.5 when the foam material has the thickness of approximately 100 mm.

* * * * *

UNITED STATES PATENT AND TRADEMARK OFFICE
CERTIFICATE OF CORRECTION

PATENT NO. : 8,901,189 B2  
APPLICATION NO. : 12/447846  
DATED : December 2, 2014  
INVENTOR(S) : McClarren et al.

Page 1 of 1

It is certified that error appears in the above-identified patent and that said Letters Patent is hereby corrected as shown below:

On the Title page, in item (73), Assignee, delete "Johnsons Controls Technology Company, Holland, MI (US)" and insert --Johnson Controls Technology Company, Holland, MI (US).--

Signed and Sealed this
Sixth Day of October, 2015

Michelle K. Lee
*Director of the United States Patent and Trademark Office*